United States Patent [19]
Takeda et al.

[11] Patent Number: 5,623,468
[45] Date of Patent: Apr. 22, 1997

[54] DISK APPARATUS FOR DETECTING ADDRESS MARKS FROM A RECORDING DISK HAVING DATA RECORDED IN A ZONED CONSTANT ANGULAR VELOCITY TYPE SYSTEM

[75] Inventors: Naoto Takeda; Mitsumasa Kubo, both of Musashino, Japan

[73] Assignee: TEAC Corporation, Japan

[21] Appl. No.: 305,179

[22] Filed: Sep. 13, 1994

[30] Foreign Application Priority Data

Sep. 17, 1993 [JP] Japan ................................. 5-231966

[51] Int. Cl.$^6$ ........................................................ G11B 7/00
[52] U.S. Cl. .............................. 369/48; 369/50; 369/58
[58] Field of Search ................................ 369/32, 44.26, 369/47–48, 50, 54, 58, 59, 111, 124

[56] References Cited

U.S. PATENT DOCUMENTS 5,432,762  7/1995  Kubo et al. ........................ 369/32

FOREIGN PATENT DOCUMENTS 6-150539  5/1994  Japan.

Primary Examiner—W. R. Young
Attorney, Agent, or Firm—Andrus, Sceales, Starke & Sawall

[57] ABSTRACT

Disk apparatus for detecting address marks in the data of a zoned constant angular velocity (ZCAV) recording disk. The apparatus includes a detecting unit for detecting sector marks in the data. Time delay circuitry establishes a time delay between sector mark detection and an address mark detecting gate period. A portion of the time delay is established by a pulse count which is independent of the reproducing frequency corresponding to the zone of the sector mark. A second portion of the time delay is established responsive to the recording frequency. The time delay so established is used to position the address mark detecting period to reliably detect the address mark.

15 Claims, 13 Drawing Sheets

FIG. 3
PRIOR ART

| NAME | FUNCTION |
|---|---|
| SM | SECTOR MARK |
| VFO | CONTINUOUS DATA PATTERN FOR PLL LOCKING |
| AM | ADDRESS MARK |
| SYNC | DATA-PART SYNCHRONIZATION SIGNAL |
| ID | ADDRESS |
| CRC | ID-PART ERROR-DETECTION CODE |
| PA | POSTAMBLE |
| ODF (OFFSET DETECTION FLAG) | MARK FOR OFFSET-DETECTION IN TRACKING-ERROR DETECTION USING PUSH-PULL METHOD |
| GAP | GAP |
| FLAG | FLAG INDICATING THAT WRITING-IN WAS PERFORMED |
| ALPC (AUTO LASER POWER CONTROL) | TEST-PART FOR CONTROLLING LASER-POWER LEVEL |
| DATA | AREA FOR WRITING USER DATA |
| BUFFER | AREA FOR DISC-ROTATION VARIATION MARGINE |
| RESYNC | SPECIAL CODE FOR SYNCHRONIZATION IN DATA AREA |

DISK APPARATUS FOR DETECTING ADDRESS MARKS FROM A RECORDING DISK HAVING DATA RECORDED IN A ZONED CONSTANT ANGULAR VELOCITY TYPE SYSTEM

BACKGROUND OF THE INVENTION

1. Field of the Invention

The present invention relates to a disc apparatus and in particular relates to a disc apparatus for reproducing data from a recording disc having data recorded thereon in a ZCAV (Zoned Constant Angular Velocity)-type system.

2. Related Art

With reference to FIG. 1, a structure of a reproducing unit in an optical disc apparatus in the related art will now be described. An interface unit 36 includes, for example, a common SCSI interface. The unit 36 receives various instructions coming from outside of the apparatus and sends relevant predetermined instructions to various units in the apparatus. How data is read out from an optical disc 31 will now be described.

If logical reading-out instructions come to the interface unit 36 from the outside, the unit 36 converts logical address data included in the coming instructions into physical address data for recording areas in the disc 31. The thus obtained physical address data is used by the unit 36 to produce seek instructions for seeking a recording area in the disc 31 having a relevant target address. The seek instructions are sent to a servo unit 35 in a disc driving system of the apparatus. The servo unit 35 drives the disc 31 through a spindle motor 32 and, according to the seek instructions, moves a pick-up 33 to the recording area in the disc 31 having the target address.

The interface unit 36 further sends reading instructions to a read-out signal processing unit 37. The unit 37 receives an RF (radio frequency) read-out signal from the pick-up 33 and obtains relevant physical address data and other read-out data from the RF read-out signal. The thus obtained address data and other read-out data is sent to the interface unit 36 from the processing unit 37. The interface unit 36 determines whether or not the physical address data sent from the processing unit 37 is identical to the physical address data obtained as a result from converting the logical address data sent from the outside. That is, the interface unit 36 determines whether or not the address which the pick-up has accessed is identical to the above target address. If the interface unit 36 determines that the address which the pick-up has accessed is identical to the above target address, the unit 36 receives the above-mentioned other read-out data from the processing unit 37 and outputs the data to the outside of the apparatus. The above-mentioned other read-out data includes data which a user actually needs.

With reference to FIGS. 2 and 3, a sector format for a magneto-optical disc and various parts included in a sector having the sector format will now be generally described. A sector mark SM is located at the head of a pre-format part and has properties such that the sector mark SM can be detected even from read-out data in an asynchronous state. The data in an asynchronous state is data from which synchronization clock pulses have not been extracted and thus it is not possible to use the synchronization clock pulses to detect the sector mark SM or the like from the asynchronous data. The above properties of the sector mark SM may include those that, for example, a mark length of the mark is especially long and signal output obtainable from the mark is larger than those obtainable from other parts. Thus, it is possible to distinguish the sector mark SM from the other parts, that is, the address part, flag part, and data part.

Address marks AM1, AM2 and AM3 are located in the pre-format part behind the sector mark SM as shown in FIG. 2. The address marks have properties such that the marks can be detected only from read-out data in a synchronous state. In the synchronous state, since a synchronization clock pulses have been extracted from the read-out data, the synchronization clock pulses can be used to detect the marks from the read-out data. The term 'read-out data in the synchronous state will be referred to as 'synchronous data' hereinafter. The synchronous data and synchronization clock pulses are output by a PLL unit which will be described later.

The three address parts ID1, ID2 and ID3 are located subsequent to the address marks AM1, AM2 and AM3, respectively, as shown in FIG. 2. These address parts ID1, ID2 and ID3 have same address data previously recorded and the address data includes a track number and a sector number. The address parts ID1, ID2 and ID3 further have numbers indicating orders of the relevant address parts in the sector. Further, the pre-format part has data patterns VFO1, VFO2 and VFO3 recorded as shown in FIG. 2 and the data patterns are used for a PLL unit's locking operation.

A flag part, a data part to have user data recorded, and a buffer part are located subsequent to the pre-format part. A magneto-optical disc apparatus first reads the pre-format part so as to obtain the address data and, after that, obtains relevant read-out data.

With reference to FIG. 4, a structure of the read-out signal processing unit using a CAV (Constant Angular Velocity)-type system in the related art will now be described. The read-out signal obtained via the optical pick-up 33 is received by wave shaping units 41 and 42 which then convert the read-out signal in an analog form into the signal in a digital form. The signal in the digital form can be easily processed by various units to process the read-out signal output from the units 41 and 42.

A reading-out timing signal producing unit 46 receives the read-out signal carrying read-out data in the asynchronous state from the wave shaping unit 41. The term 'read-out data in the asynchronous state' will be referred to as 'asynchronous data' hereinafter. The reading-out timing signal producing unit 46 further receives reference clock pulses to be used for obtaining read-out data to be output to the interface unit 36. The reference clock pulses are supplied by a reference-clock-pulse generating unit 43.

The reading-out timing signal producing unit 46 detects the sector mark SM from the received asynchronous data and outputs a corresponding sector-mark detection signal to an address demodulating unit 47. The producing unit 46 produces an address-mark detecting-timing signal for detecting the address marks AM and outputs the signal to the address demodulating unit 47.

The reading-out timing signal producing unit 46 further produces various reading-out timing signals indicating data demodulating timing and sends the signals to a data demodulating unit 45. The producing unit 46 supplies a locking timing gate signal to the PLL unit 44 which then uses the signal for VFO detection by gating a signal carrying the synchronous data.

The PLL unit 44 receives the reference clock pulses and locking timing gate signal, each signal having frequency approximately identical to a reproducing frequency. The reproducing frequency is a frequency suitable to a recording frequency in which data has been recorded in a recording disc. That is, the data has been recorded in the recording disc in synchronization with clock pulses having the recording frequency. Using the reference clock pulses and locking timing gate signal, the PLL unit 44 produces the synchronous data and synchronization clock pulses from the asynchronous data sent from the wave shaping unit 42. The synchronous data and synchronization clock pulses are sent to the address demodulating unit 47 and data demodulating unit 45.

The address demodulating unit 47 demodulates the address data from the synchronous data. If the unit 47 has properly demodulated the address data, the unit 47 sends timing correcting pulses to the reading-out timing signal producing unit 46 which uses the timing correcting pulses to correct timing indicated by the address-mark detecting timing signal and reading-out timing signals.

The data demodulating unit 45 demodulates reading-out data to be supplied to the interface unit 36 from the synchronous data in response to the reading-out instructions sent from the interface unit 36. The demodulation is carried out in synchronization with the timing indicated by the reading-out timing signals.

With reference to FIG. 5, details of the reading-out timing signal producing unit 46 and address demodulating unit 47 will now be described. The reading-out timing signal producing unit 46 includes a sector-mark detecting unit 51, a sector-length counter 52, a preset unit 60 and a gate-span setting unit 61.

The address demodulating unit 47 includes an address-mark detecting gate producing unit 55, an address-mark detecting unit 56, an address-data demodulating gate production unit 57, an address-data demodulating unit 58 and an address-data determining unit 59.

The sector-mark detecting unit 51 detects a sector mark SM indicating the beginning of a sector from asynchronous data read out from a recording disc and outputs a sector-mark detection pulse when the unit 51 detects the rear end of the detected sector mark SM. The sector-mark detection is achieved by detecting a particular pattern of the sector mark from the asynchronous data, for example, sampled in synchronization with system clock pulses having a frequency quite a lot higher than the reproducing frequency.

Data lengths of each part of all the parts included in a sector according to the standard sector format shown in FIG. 2 are previously stored in the sector-length counter 52. After the sector mark has been detected, the sector-length counter 52 counts the reference clock pulses according to the stored data lengths so as to output address-mark detecting timing pulses and various reading-out timing pulses corresponding to the data lengths of the parts of a sector. The counter 52 is a loop-type counter which automatically starts the same counting from an initial counting value '0' after completing the counting for all the data lengths of a sector.

The preset unit 60 receives the sector-mark detection pulse from the sector-mark detecting unit 51 and the timing correcting pulses from the address demodulating unit 47. When the sector detection pulse has been received or when the timing correction pulses are received, the preset unit 60 supplies timing correcting data to the sector-length counter 52 so as to set appropriate numbers to the counter 52. That is, whether or not the counter 52 has already counted a number, the preset unit sets a certain count number to the counter regardless of the already counted number if it is present in the counter. Thus, the counter 52 has the certain count number as if the certain count number were obtained as a result of the counter 52 having counted. Thus, the counter 52 counts from the thus set certain count number. Thus, the counter 52 is in synchronization with the actual coming timing of the parts of the sector shown in FIG. 2.

The address-mark detecting pulses output by the sector-length counter 52 have to be in synchronization with the synchronous data so as to effectively extract the address marks from the synchronous data. Time difference is inevitably present between the asynchronous data supplied to the sector-mark detecting unit 51 and the synchronous data supplied by the PLL unit 44, due to properties of circuits through which the data passes. Specifically, the synchronous data is delayed from the asynchronous data by several bits.

According to the above-mentioned time difference, the preset unit 60 supplies timing correcting data together with a loading signal to the sector-length counter 52 when the sector-mark detection pulse has been received. A count number corresponding to the timing correcting data including an offset value corresponding to the above-mentioned time difference is set to the counter 52 so that a current count number of the sector-length counter 52 is appropriately corrected. As a result, the timing pulses generated by the sector-length counter 52 are synchronized with the synchronous data.

If the sector-mark detecting unit 51 has failed in detecting of the sector mark, the preset unit 60 supplies the timing correcting data together with the loading signal to the sector-length counter 52 when the timing correcting pulses have been supplied to the preset unit 60. A count number corresponding to the timing correcting data is preset to the sector-length counter 52 so that the current count number of the sector-length counter 52 is appropriately corrected according to the above-mentioned time difference. Thus, even if the sector-mark detection has been missed, the timing correcting pulses can be used, instead of the sector-mark detection pulse, to correct the generation timing of the timing pulses supplied by the sector-length counter 52 according to the above-mentioned time difference between the synchronous data and asynchronous data.

The gate-span setting unit 61 generates a gate-span setting signal to be supplied to the address-mark detecting gate producing unit 55. In the generation of the gate-span setting signal, the unit 61 uses the sector-mark detection signal and a current counted value of the sector-length counter 52. The gate-span setting signal instructs as to whether the necessary and minimum first time span or a second time span longer than the first time span is used as a time span of an address-mark detecting gate period which is to be defined by address-mark detecting gate producing unit 55.

The gate-span setting unit 61 produces the gate-span setting signal instructing the first time span when the sector-mark detection pulse has been received. If the above-mentioned counted value has reached a reference value, the unit 61 produces the gate-span setting signal instructing the second time span. This reference value is a counted value of the sector-length counter 52 corresponding to the rear end of all the address-mark detecting gate periods defined For a sector. Thus, the longer second time span is used as a time span of the address-mark detecting gate period when reading out of a subsequent sector is begun.

The address-mark detecting gate producing unit 55 receives the address-mark detecting timing pulses, indicating the beginning of the address marks present in the synchronous data, from the sector-length counter 52 so as to produce signals indicating the corresponding address-mark detecting gate periods to be sent to the address-mark detecting unit 56. The address-mark detecting unit 56 detects the address marks from the synchronous data in synchronization with the synchronization clock pulses during the address-mark detecting gate periods. The detecting unit 56 outputs address-mark detection pulses when the ends of the address marks have been detected.

The address-data demodulating gate producing unit 57 produces address-data demodulating gate periods using, as a reference time, the time when the address-mark detection pulses have been received. Signals indicating the address-data demodulating gate periods are sent to the address-data demodulating unit 58 which includes a 2-7 demodulating unit and a CRC checking unit and demodulates address data present during the address-data demodulating gate periods.

The address-data determining unit 59 determines what numbers orders of the address data sent from the address-data demodulating unit 58 in the sector are. In accordance with the determined numbers, the unit 59 produces any one of timing correcting pulses (1), (2) and (3) to be sent to the preset unit 60. That is, if a determined number of the above-mentioned determining numbers indicates that relevant address data is address data written in the first address part ID1 shown in FIG. 2, the unit 59 produces the timing correcting pulse (1) instructing the beginning of the VF02. Similarly, if a determined number of the above-mentioned determining numbers indicates that relevant address data is address data written in the second address part ID2, the unit 59 produces the timing correcting pulse (2) instructing the beginning of the VFO3. If a determined number of the above-mentioned determining numbers indicates that relevant address data is address data written in the third address part ID3, the unit 59 produces the timing correcting pulse (3) instructing the beginning of the flag part.

Thus, the preset unit 60, only if the sector-mark detection has been missed, presets a count number corresponding to the timing correcting data, to the sector-length counter 52, corresponding to the above-described timing correcting pulses (1), (2) and (3) when the timing correcting pulses have been supplied. Thus, the count number corresponding to the timing correcting data is set to the sector-length counter 52 so that the current count number of the counter 52 is appropriately corrected according to the time difference between the synchronous data and asynchronous data.

Operation in a case when the address mark AM1 shown in FIG. 2 is detected will now be described. As described above, the sector-length counter 52 receives the timing correcting data, for correcting the count number in the counter 52 according to the time difference between the synchronous data and asynchronous data, when the sector-mark detection pulse has been received. The counter 52 thus counts the reference clock pulses for an offset corresponding to the time difference and then for the data length of the VFO1 since the rear end of the sector mark SM was detected. As a result, the counter 52 generates the address-mark detecting timing pulse for the address mark AM1 when the above counting has been completed, the pulse thus instructing the beginning of the address mark AM1 in the synchronous data.

The address-mark detecting gate producing unit 55 receives the thus generated address-mark detecting timing pulse for AM1 and thus produces the address-mark detecting gate period for AM1 to be sent to the address-mark detecting unit 56. The gate producing unit 55 uses the gate-span setting signal, specifying the above-mentioned first time span, sent from the gate-span setting unit 61 so that the produced address-mark detecting gate period has the first time span.

The address-mark detecting unit 56, during the time span of the thus produced address-mark detecting gate period for AM1, detects the address mark AM1 from the synchronous data in synchronization with the synchronization clock pulses. The unit 56 outputs the address-mark detection pulse for AM1 indicating the rear end of the address mark AM1.

The address-data demodulating gate producing unit 57 produces the address-data demodulating gate period for the address data including data written in the address part ID1 using, as a reference time, the time the address-mark detecting pulse for AM1 has been received. A signal indicating the produced gate period is sent to the address-data demodulating unit 58 which, during the time span of the sent gate period, demodulates the address data written in the address part ID1.

The address-data determining unit 59, using the address data of the address part ID1 sent from the demodulating unit 58, determines that the thus sent address data is data in the first address part in the sector. As a result, the determining unit 59 produces the above-mentioned timing correcting pulse (1) instructing the beginning of the VFO2 in the synchronous data and sends the pulse to the preset unit 60.

Operation in cases where the address marks AM2 and AM3 are detected will now be described. After the timing correcting pulse (1) has been thus produced, the sector-length counter 52 produces the address-mark detecting timing pulse for AM2 and address-mark detecting timing pulse for AM3 to be sent to the address-mark detecting gate producing unit 55. The address mark detecting unit 56, using the thus produced pulses for AM2 and AM3, detects the address marks AM2 and AM3, and produces the corresponding address-mark detection pulse for AM2 and that for AM3, similarly to the case where the address mark AM1 is detected.

The address-data determining unit 59 receives the address data of the second address part ID2 subsequent to the address mark AM2 and thus produces the timing correcting pulse (2) instructing the beginning of the VFO3. The address-data determining unit 59 receives the address data of the third address part ID3 subsequent to the address mark AM3 and thus produces the timing correcting pulse (3) instructing the beginning of the flag part.

The sector-length counter 52, after producing the address-mark detecting timing pulse for AM3, produces the various reading-out timing pulses such as a flag-part beginning timing pulse, a data-part beginning timing pulse, a buffer-part beginning timing pulse, and so forth to be sent to the data demodulating unit 45.

Since the sector-length counter 52 is the loop-type counter as described above, even if detection of the sector mark in a current sector fails, as long as an address mark of the address marks AM1, AM2 and AM3 was properly detected in an antecedent sector, the sector-length counter 52 produces the address-mark detecting timing pulses for the current sector in approximately proper timing. This is because, as described above, the counter 52 acting as the loop-type counter automatically begins a counting action counting the reference clock pulses from the initial counting value '0' after completing the counting for all the data lengths of the antecedent sector. Further, in this case, since no sector-mark detection pulse has been supplied to the gate-span setting unit 61, the unit 61 produces the gate-span setting signal specifying the above-mentioned second time span for a relevant gate period. Since the second time span is longer than the necessary and minimum first time span as mentioned above, it is likely that an address mark of the marks AM1, AM2 and AM3 can be detected from the current sector although the sector mark could not be detected.

If the sector mark could not be detected and an address mark of the address marks AM1, AM2 and AM3 could be detected, the timing correcting pulses corresponding to the detected address mark are produced so as to be sent to the preset unit 60. Then, the sector-length counter 52 thus has the sent timing correcting pulses preset thereto by the preset unit 60 so that a current count number of the counter 52 is corrected. Thus, the counter 52 can generates the timing pulses in corrected timing.

If the detection of the sector mark has been missed, a time span of the address-mark detecting timing gate period is kept at the long second time span even after the address mark has been detected. Thus, since the time span of the gate period is long, subsequent address marks are likely to be detected.

If the sector mark has been properly detected, the count number is corrected in the sector-length counter 52 according to the time difference between the synchronous data and asynchronous data only when the sector mark has been detected. The count number is not corrected in the sector-length counter 52 according to the time difference by the timing correcting pulses produced due to the address-mark detection.

Such a time difference between the synchronous data and asynchronous data includes an independent component, independent of the above-mentioned reproducing frequency, approximately the same as the frequency of the reference clock pulses and a dependent component varying depending on the reproducing frequency. The above independent component of the time difference occurs due mainly to the wave shaping unit 52. The above dependent component is time delay having time for one period of the reference clock pulses and occurs in the PLL unit 44.

In a CAV-type magneto-optical disc recording/reproducing system, time-axis data-recording densities in a recording disc are uniform over different recording zones classified along a radius of the disc. The condition where the time-axis data-recording densities are uniform is referred to as a condition where, as long as the disc is rotated at a constant angular velocity, recording densities seen via a pick-up accessing the disc are apparently uniform. Such condition can be achieved as a result of the actual recording densities being closer in the recording zones near the center of the disc. In this system, reference clock pulses such as described above have to have a single frequency corresponding to the reproducing frequency for all the recording zones. Thus, the time difference between the synchronous data and asynchronous data is also constant over the recording zones. As a result, the timing correcting data produced by the preset unit 60 can be produced according only to this constant time difference.

Instead of the above-mentioned CAV-type system, a ZCAV-type magneto-optical disc recording/reproducing system has recently been proposed. In the ZCAV system, time-axis recording densities are different over different recording zones classified along a radius of the disc. Specifically, the time-axis recording densities are closer as the zones are away from the center of the disc. Thus, actual recording densities (not the time-axis apparent recording densities but recording densities seen while the disc is static) are made uniform over the zones. As a result, it is possible to make actual data recording densities in the disc higher. In this system, the different reproducing frequencies are necessary to reproduce data from the recording disc so that the reference clock pulses have to have different frequencies over the recording zones. Thus, the time difference between the synchronous data and asynchronous data is different among the recording zones. As a result, the timing correcting data produced by the preset unit 60 can be produced according to those different time differences.

As mentioned above, it is assumed in the CAV-type system that the time difference between the synchronous data and asynchronous data is fixed. Thus, the timing correcting data produced by the preset unit 60 uses the fixed time difference for the all the recording zones. Thus, if the above-described read-out signal processing unit 37 for the CAV-type system were used for the ZCAV system, the thus generated address-mark detecting gate periods might not have proper generation timing corresponding to actual address-mark positions in the disc. Thus, it might be likely that the address marks could not be properly detected.

By making earlier of the generation timing of the address-mark detecting gate periods and extending the time spans of the gate periods, missing of the address-mark detection can be prevented. However, in this modification, erroneous address-mark detection is likely to occur due to the extended gate-period time-spans.

SUMMARY OF THE INVENTION

An object of the present invention is to provide a reliable disc apparatus in which miss/erroneous address-mark detection is not likely to occur although the reproducing frequency is different among the recording zones in a recording disc.

In order to achieve the above object, a disc apparatus according to the present invention detects the sector mark serving as the beginning mark. A time-span corresponding to a length of the detected sector mark is used to determine in which zone of the recording zones a relevant sector is included. The reproducing frequency previously decided for each recording zone can be obtained from the thus determined recording zone. The thus obtained reproducing frequency is used as the reproducing frequency to read out data from the recording disc. The reproducing frequency is used to determine how long a delay time is between the sector mark detection and an expected address detection.

Specifically, the reference clock pulses are produced having the thus obtained reproducing frequency. The produced pulses are counted a predetermined number of times so as to obtain a first delay time, the predetermined number independent of the recording zones of the recording disc. A second delay time depending on the obtained reproducing frequency is added to the first delay time so as to obtain the above-described delay time. A gate period is provided at a time obtained as a result of the elapse of the thus obtained delay time after the time the sector mark has been detected. Detection of the address mark is attempted only during this gate period. Thus, it is possible to detect the address mark efficiently and surely.

Other objects and further features of the present invention will become more apparent from the following detailed description when read in conjunction with the accompanying drawings.

BRIEF DESCRIPTION OF THE DRAWINGS

FIG. 3 shows functions of each part included in the sector format shown in FIG. 2;

DESCRIPTION OF THE PREFERRED EMBODIMENTS

Figure 2:
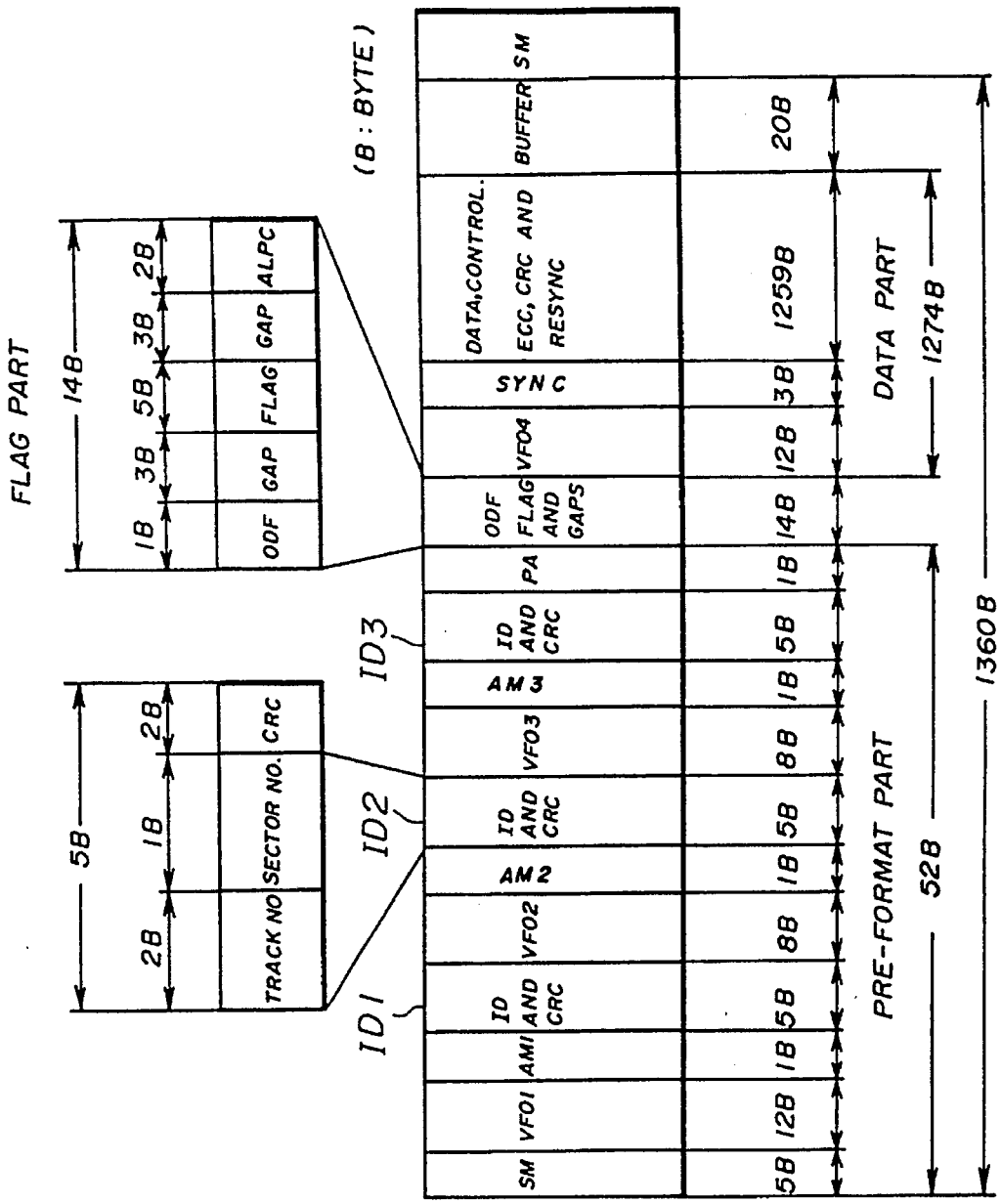
FIG. 2 illustrates a sector format for a magneto-optical disc in the related art.
Figure 6:
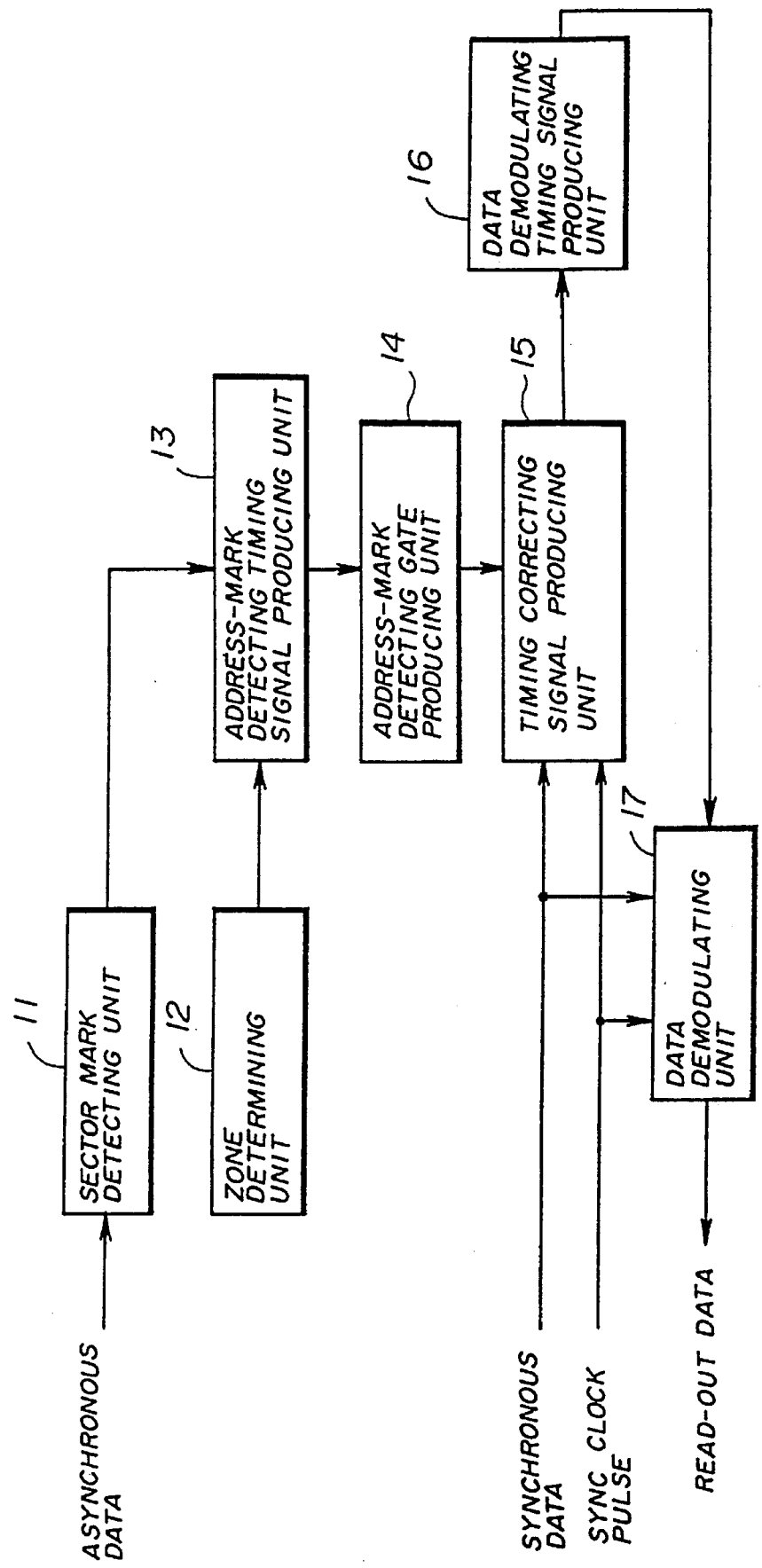
FIG. 6 shows a block diagram of a first embodiment of the present invention.

With reference to FIG. 6, an optical disc reproducing apparatus in a first embodiment of a disc apparatus according to the present invention will now be described. A structure shown as the block diagram shown in FIG. 6 indicates a principle of magneto-optical disc apparatuses in a second embodiment, a third embodiment, a first variant of the third embodiment and a second variant of the third embodiment of a disc apparatus according to the present invention, which will be described later. The apparatus shown in FIG. 6 is used for the above-described ZCAV-type system so that difference reproducing frequencies are used for reproducing data from different recording zones provided on an optical disc. In each sector of the recording zones, the sector mark, address marks, address parts and a data part are provided as shown in FIG. 2.

A sector-mark detecting unit 11 detects the sector mark from the above-described asynchronous data and thus produces a sector-mark detection signal. A zone determining unit 12 determines, using the above asynchronous data, which zone of the recording zones a currently accessed sector is included. An address-mark detecting timing signal producing unit 13 receives a zone determination signal indicating the determination given by the zone determining unit 12. Thus, the producing unit 13 produces an address-mark detecting timing signal after a predetermined time has elapsed since the sector mark had been detected. The predetermined time is previously decided depending on the recording zones. An address-mark detecting gate producing unit 14 produces an address-mark detecting gate period having a predetermined time span, the signal being in synchronization with the address-mark detecting timing signal. A timing correcting signal producing unit 15, during the above-mentioned gate period, detects an address mark of the address marks from the above-described synchronous data. The producing unit 15 thus produces a timing correcting signal using, as a reference time, the time the address mark was detected.

A data demodulating signal producing unit 16 produces a data demodulating timing signal based on the produced timing correcting signal. A data demodulating unit 17 demodulates read-out data from the synchronous data using the produced data demodulating timing signal.

Thus, it is possible to produce the address-mark detecting gate period with proper timing over all the recording zones and it is thus possible to make the time span of the gate period to be the necessary and minimum time span. As a result, missing of/erroneous address-mark detection is not likely to occur and thus it is possible to improve reliability of the disc apparatus.

Further, the address-mark detecting timing signal producing unit 13 includes a reference-clock-pulse producing unit using the zone determination signal for producing a reference clock pulses having a frequency identical to the reproducing frequency previously decided for the recording zone determined by the zone determining unit 12. It is preferable that the producing unit 13 further includes a sector-length counter counting the produced reference clock pulses since the sector mark has been detected for producing an address-mark detecting reference signal and a data demodulating timing signal. The producing unit further includes a counting correcting unit for supplying timing correcting data to the sector-length counter at the time the sector mark has been detected and at the time the timing correcting signal has been supplied.

The address-mark detecting timing signal producing unit 13 further includes a delay unit. The delay unit delays the address-mark detecting reference signal sent from the sector-length counter by predetermined time during time between the time the sector mark has been detected and time the address mark is detected. It is preferable that this predetermined time varies depending on the zone of the recording zones determined by the zone determining unit. Thus, the delay unit obtains an address-mark detecting timing signal to be output. After the address mark has been detected, the delay unit does not delay the address-mark detecting reference signal sent from the sector-length counter and thus outputs the signal as the address-mark detecting signal.

The reference clock pulse producing unit, and sector-length counter are also included in the data demodulating timing signal producing unit 16. It is preferable that the counting correcting unit is also included in the data demodulating timing signal producing unit 16.

The counting correcting unit supplies the timing correcting data to the sector-length counter at the time the sector mark is detected and at the time the address mark is detected as mentioned above. Thus, the count number of the sector-length counter is appropriately corrected so that the accuracy of address-mark detecting timing is improved. As a result, missing of/erroneous address-mark detection can be prevented. Also, it is possible to make timing of the data demodulating signal accurate so that proper read-out data can be supplied by accurate-timing demodulation from the synchronous data.

Further, the sector-length counter is the above-described loop-type counter. The apparatus shown in FIG. 6 further includes a gate-span setting unit for specifying the necessary and minimum first time span as the time span of the address-mark detecting gate period when the sector mark has been detected and when the address mark has been detected. The gate-span setting unit specifies a second time span longer than the first time span as the time span of the address-mark detecting gate period, during time between time production of the address-mark detecting gate periods for the address marks of a sector has been produced and time a subsequent sector is accessed. The address-mark detecting signal producing unit sets, as the time span of the address-mark detecting gate period, either the first time span or the second time span according to the specifications made by the gate-span setting unit.

Thus, even if the sector-mark detection is missed, the address mark may be detected during the address-mark detecting gate period having the longer second time span. If the address mark has been detected, the time span of the address-mark detecting gate period is set to be the necessary and minimum first time span when the address mark has been detected. As a result, since the necessary and minimum first time span is used as the gate period to detect address marks subsequent to the thus detected address mark, erroneous address-mark detection is not likely to occur for the subsequent address marks.

Figure 1:
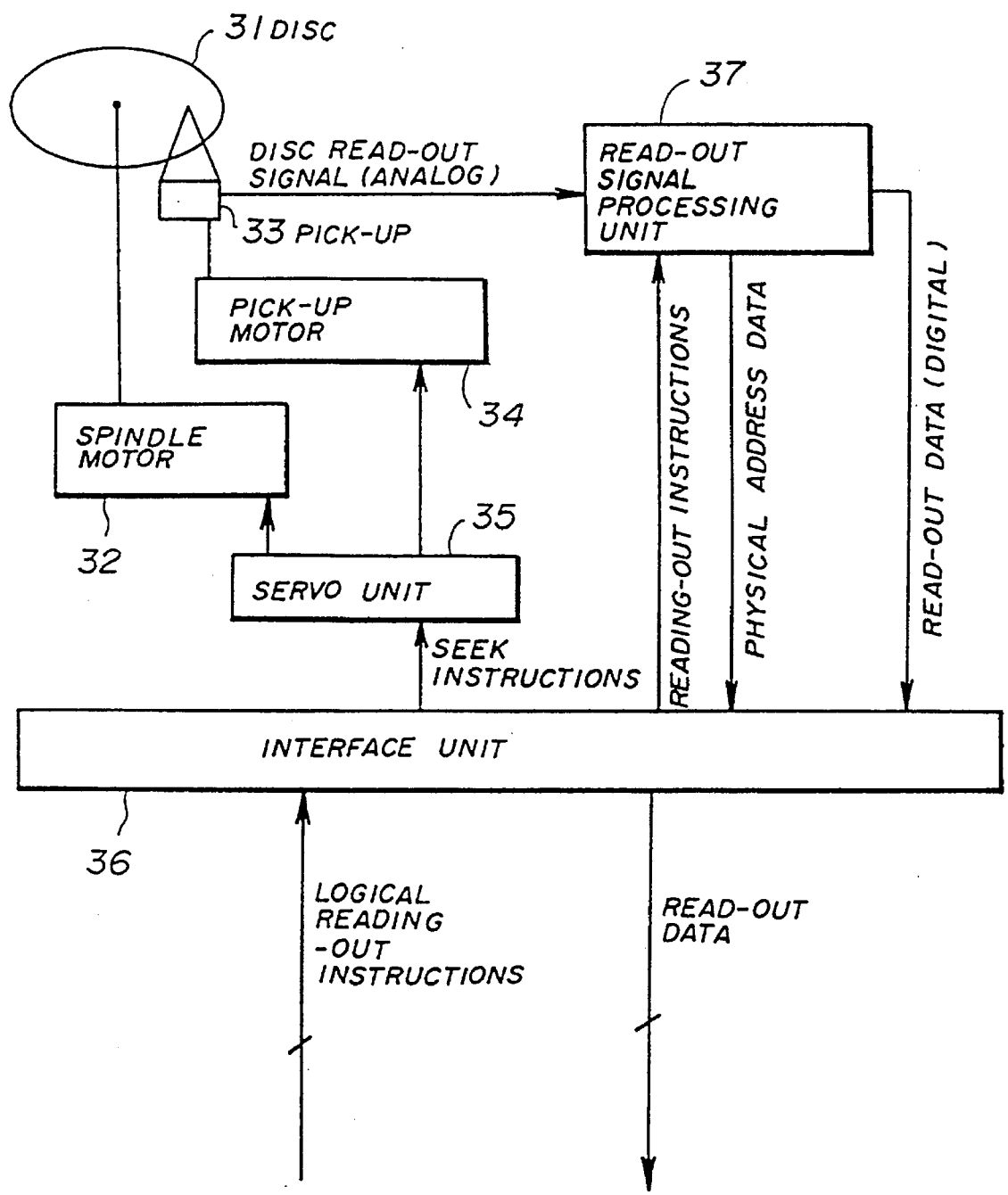
FIG. 1 shows a block diagram of a reproducing unit of an magneto-optical disc apparatus in the related art.
Figure 7:
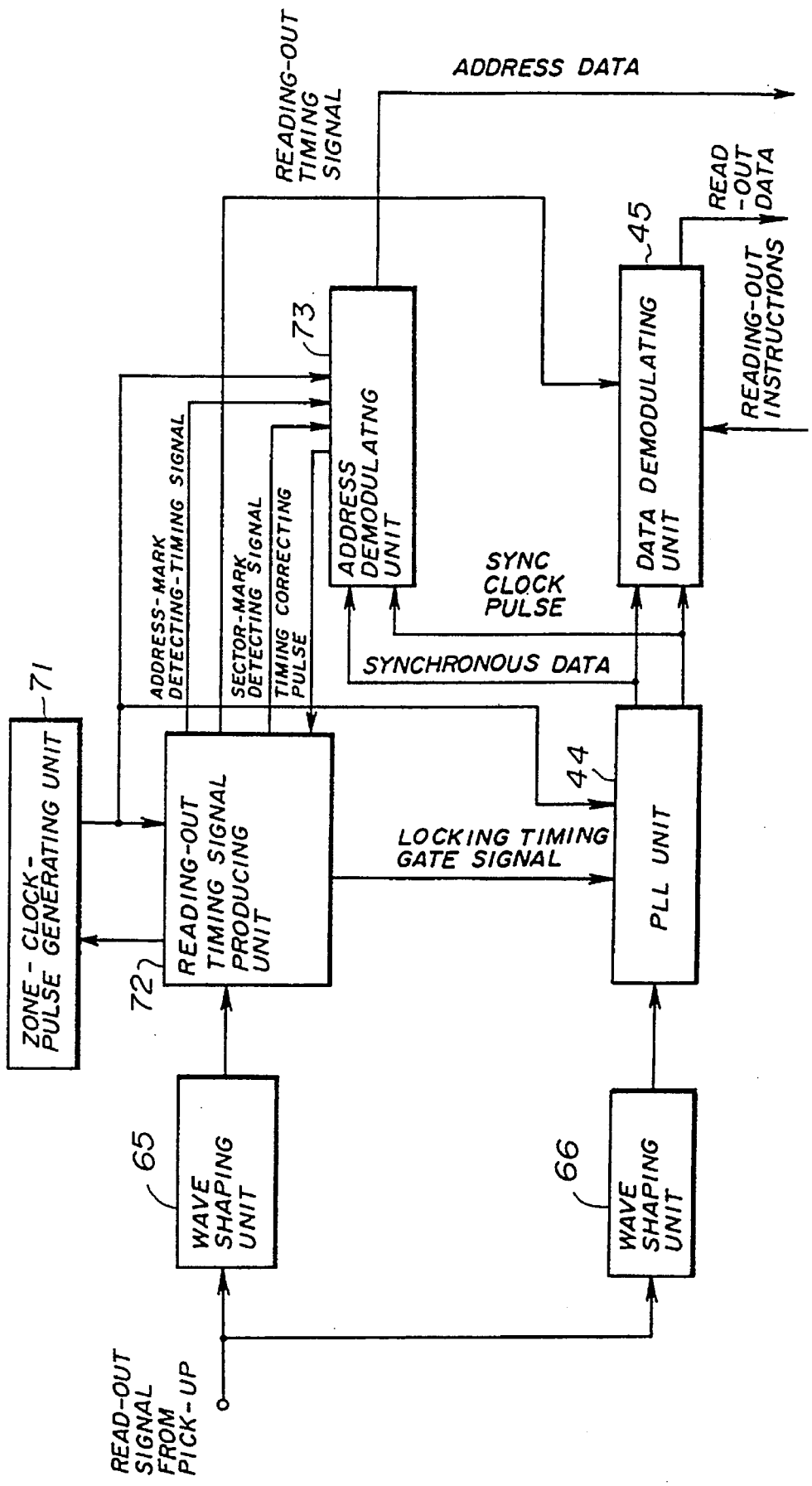
FIG. 7 shows a block diagram of a read-out signal processing unit for a ZCAV-type system, the block diagram being common to a second embodiment, a third embodiment, a first variant of the third embodiment and a second variant of the third embodiment of a disc apparatus according to the present invention.

With reference to FIG. 7, a block structure of a read-out signal processing unit for a ZCAV-type system in a magneto-optical disc apparatus according to the present invention will now be described. The block structure is common to a second embodiment, a third embodiment, a first variant of the third embodiment and a second variant of the third embodiment of a disc apparatus according to the present invention. A block structure of a reproducing unit of this magneto-optical disc apparatus is similar to that shown in FIG. 1 and a block structure of the read-out signal processing unit 37 shown in FIG. 1 is that shown in FIG. 7 for the magneto-optical disc apparatuses in the embodiments of the present invention. A sector format of a magneto-optical disc applicable to the magneto-optical disc apparatuses in the embodiments of the present invention is the same as that shown in FIG. 2. Reference numerals are given to blocks of the read-out signal processing unit shown in FIG. 7 identical to blocks of the unit shown in FIG. 4, the reference numerals being the same as those given to the corresponding blocks of the unit shown in FIG. 4. Description of the identical blocks are appropriately omitted.

A read-out signal sent from the optical pick-up 33 is supplied to the wave shaping units 65 and 66 which convert the read-out signal in an analog form into that in a digital form. It is easy for units subsequent to the wave shaping units 65 and 66 to process the signal in the digital form. The wave shaping unit 65 includes a comparator for detecting a top level and a bottom level of an input signal and thus approximately no time delay is present between the input signal and an output signal. The wave shaping unit 66 includes a differential unit in order to adapt properties of the unit 66 to properties of the PLL unit 44. Thus, a constant time delay is present between the input signal and the output signal.

Figure 4:
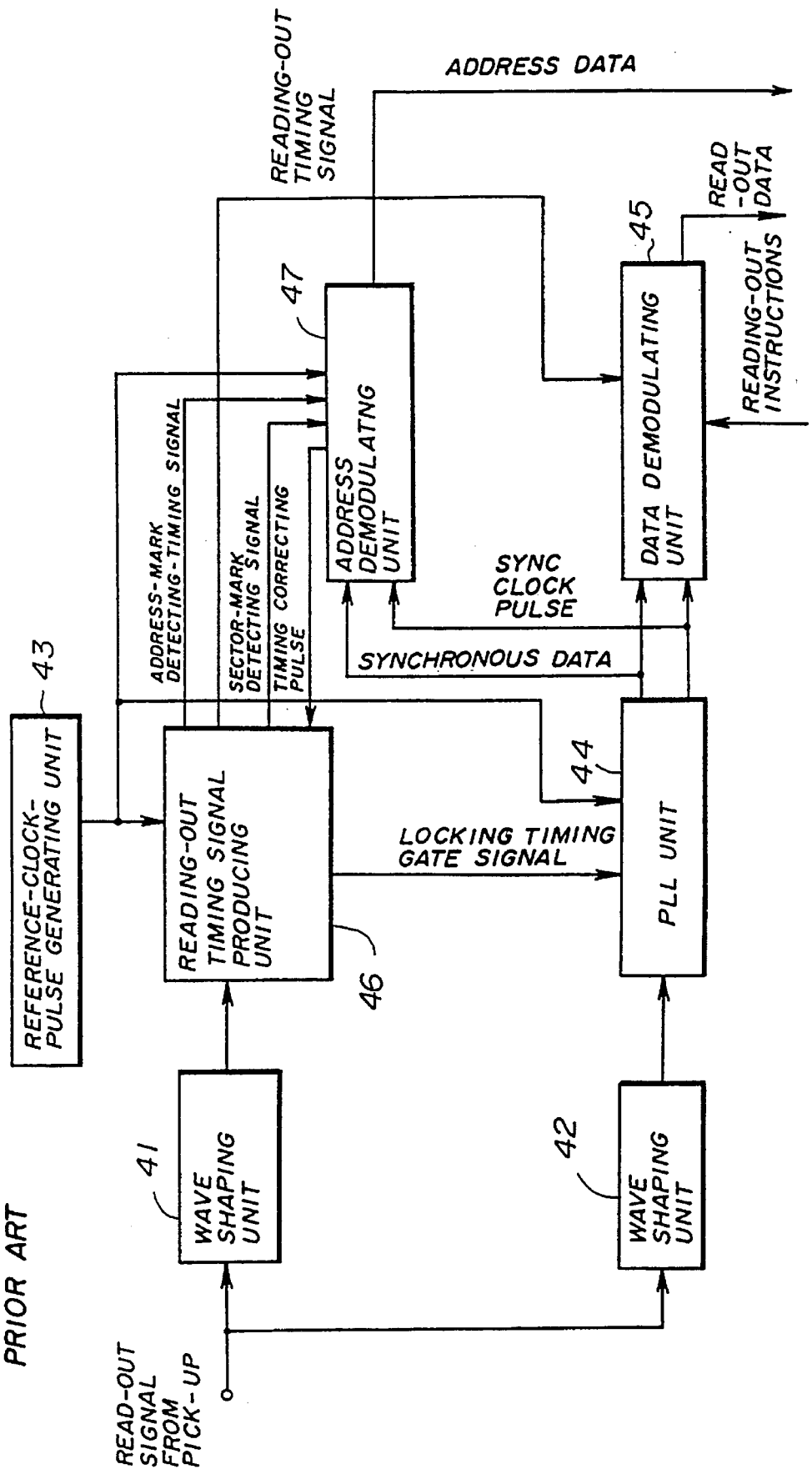
FIG. 4 shows a block diagram of a read-out signal processing unit shown in FIG. 1 in a CAV-type system in the related art.

Instead of the reference-clock-pulse generating unit 43 shown in FIG. 4, a zone-clock-pulse generating unit 71 is provided for supplying zone clock pulses having frequencies different among accessed recording zones in order to adapt the read-out signal processing unit shown in FIG. 7 to the above-described ZCAV-type system. The frequencies of the zone clock pulses are approximately the same as the reproducing frequencies used in the ZCAV-type system.

A reading-out timing signal producing unit 72 receives the above-described asynchronous data sent from the wave shaping unit 65 and the zone clock pulses sent from the zone-clock-pulse generating unit 71. The producing unit 72 detects the above-mentioned sector mark from this asynchronous data and thus supplies the above-mentioned sector-mark detection signal to an address demodulating unit 73. The producing unit 72 further produces an address-mark detecting reference signal indicating reference timing for detecting the above-mentioned address marks and the thus produced signal is supplied to an address demodulating unit 73. Further, the producing unit 72 produces various reading-out timing signals indicating data demodulating timing and supplies the thus produced signals to the data demodulating unit 45. The producing unit 72 further supplies the locking timing gate signal for the VFO detection to the PLL unit 44.

The PLL unit 44 receives the zone clock pulses and locking timing gate signal. Using the zone clock pulses and locking timing gate signal, the PLL unit 44 produces the synchronous data and synchronization clock pulses from the asynchronous data sent from the wave shaping unit 66. The synchronous data and synchronization clock pulses are sent to the address demodulating unit 73 and data demodulating unit 45.

The address demodulating unit 73 demodulates the address data from the thus sent synchronous data. If the unit 73 has properly demodulated the address data, the unit 73 sends timing correcting pulses to the reading-out timing signal producing unit 72 which uses the timing correcting pulses to correct timing indicated by the address-mark detecting reference signal and reading-out timing signals.

The data demodulating unit 45 demodulates reading-out data to be supplied to the interface unit 36 from the synchronous data in response to the reading-out instructions sent from the interface unit 36. The demodulation is carried out in synchronization with the timing indicated by the reading-out timing signals.

Figure 5:
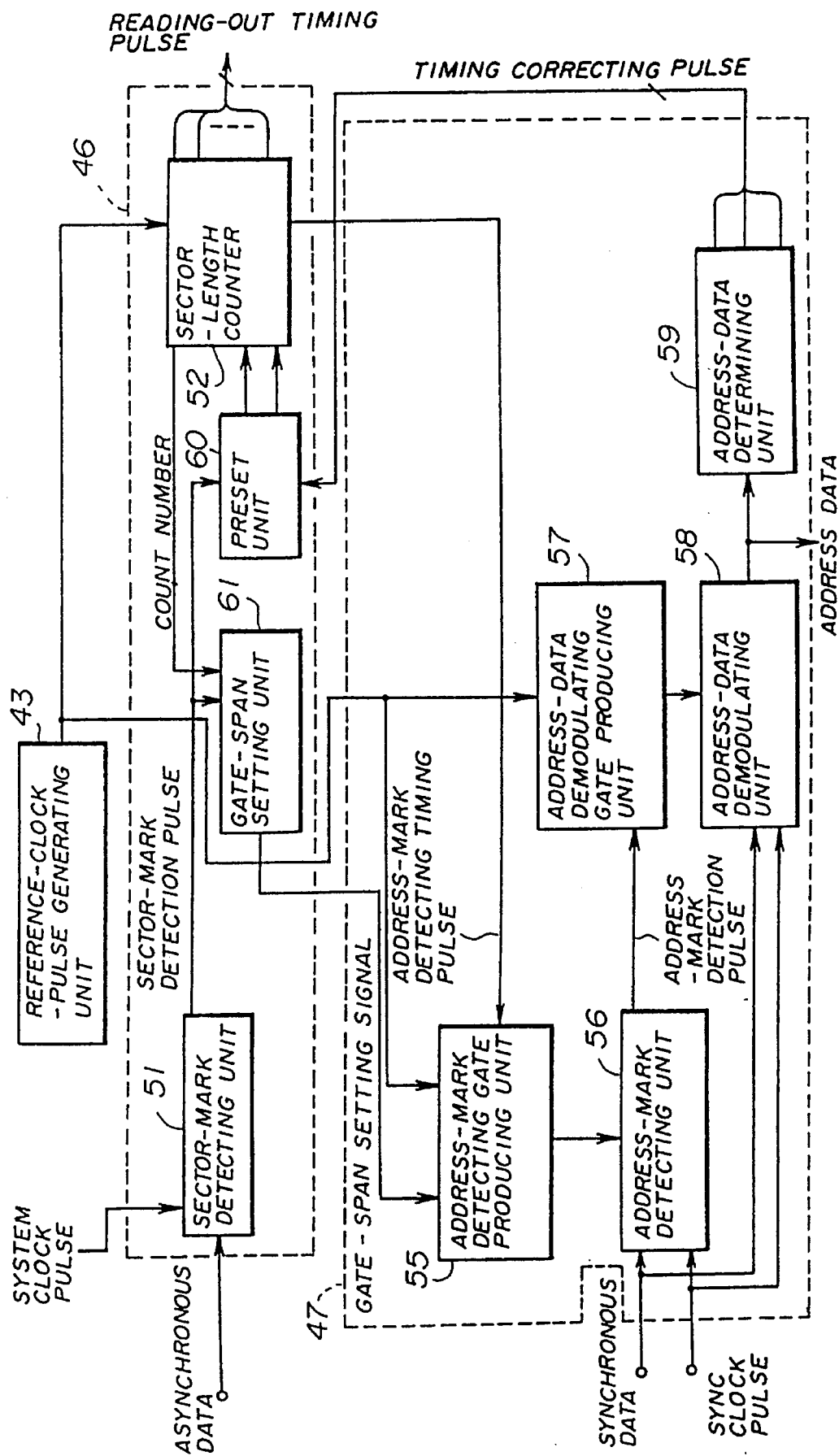
FIG. 5 shows a block diagram of a reading-out timing signal producing unit and an address demodulating unit shown in FIG. 4.
Figure 8:
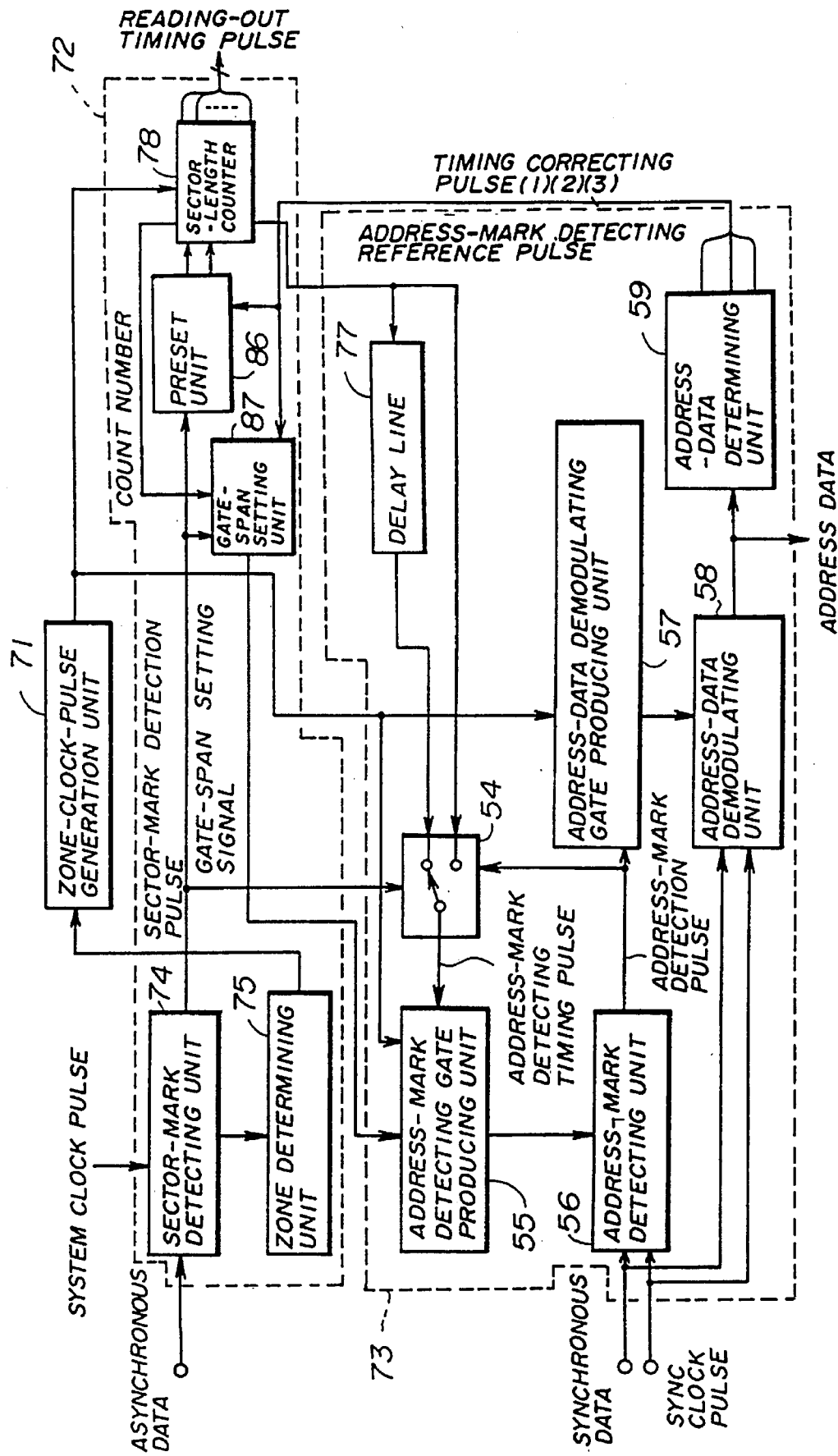
FIG. 8 shows a block diagram of a reading-out timing signal producing unit and an address demodulating unit shown in FIG. 7 in the second embodiment.

With reference to FIG. 8, details of the reading-out timing signal producing unit 72 and address demodulating unit 73 will now be described. Reference numerals are given to blocks shown in FIG. 8 identical to blocks shown in FIG. 5, the reference numerals being the same as those given to the corresponding blocks of the unit shown in FIG. 5. Description of the identical blocks are appropriately omitted.

The reading-out timing signal producing unit 72 includes a sector-mark detecting unit 74, a zone determining unit 75, a sector-length counter 78, a preset unit 86 and a gate-span setting unit 87.

The address demodulating unit 73 includes a delay line 77, a selector 54, the address-mark detecting gate producing unit, the address-mark detecting unit 56, the address-data demodulating gate production unit 57, the address-data demodulating unit 58 and the address-data determining unit 59.

The sector-mark detecting unit 74 detects the sector mark SM from the asynchronous data read out from a recording disc and outputs the sector-mark detection pulse when the unit 51 detects the rear end of the detected sector mark SM. The sector-mark detection is achieved by detecting a particular pattern of the sector mark from the asynchronous data, for example, sampled in synchronization with the system clock pulses having a frequency quite a lot higher than the frequency of the zone clock pulses.

The sector-mark detecting unit 74 further measures a time span of the thus detected sector mark by counting the system clock pulse and informs the thus obtained time span to the zone determining unit 75. The zone determining unit 75 uses the thus informed time span so as to determine which zone of the recording zones, classified along the radius of the disc, the sector including the detected sector mark is included. The determining unit 75 thus sends information indicating the thus determined zone to the zone clock pulse generating unit 71. The generating unit 71 uses the thus sent information and thus generates zone clock pulses having a frequency previously set for the zone including the current sector.

Data lengths of each part of all the parts included in the sector according to the standard sector format shown in FIG. 2 are previously stored in the sector-length counter 78. After the sector mark has been detected, the sector-length counter 78 counts the zone clock pulses according to the stored data lengths so as to output address-mark detecting timing pulses and various reading-out timing pulses corresponding to the data lengths of the parts of a sector. The counter 78 is the above-described loop-type counter which automatically starts the same counting from an initial counting value '0' after completing the counting for all the data lengths of a sector.

The preset unit 86 receives the sector-mark detection pulse from the sector-mark detecting unit 74 and the timing correcting pulses from the address demodulating unit 73. When the sector detection pulse has been received or when the timing correction pulses are received, the preset unit 86 supplies corresponding timing correcting data to the sector-length counter 78 so as to set appropriate count numbers to the counter 78. The appropriate count numbers corresponding to data lengths between the beginning of the sector and the beginning of the sector mark and other parts in the sector shown in FIG. 2.

As described above, a time difference is inevitably present between the asynchronous data supplied to the sector-mark detecting unit 74 and the synchronous data. Such a time difference between the synchronous data and asynchronous data includes an independent component independent of the above-mentioned reproducing frequencies approximately the same as the frequencies of the zone clock pulses and a dependent component varying depending on the reproducing frequencies. The above independent component of the time difference occurs due to mainly the wave shaping unit 66. The above dependent component is a time delay having time for one period of the zone clock pulses and occurs in the PLL unit 44. The time difference, that is, the time delay of the synchronous data with respect to the asynchronous data, can be expressed as tc+Tz. The term tc means a fixed time delay independent of the reproducing frequencies. The term Tz means a time of one period of the zone clock pulses. The address-mark detecting pulses supplied to the address-mark detecting gate producing unit have to be in synchronization with the synchronous data so as to effectively and certainly extract the address marks from the synchronous data.

In the disc apparatus in the second embodiment of the present invention shown in FIG. 8, delay time created by the delay line 77 is previously set to be the above-mentioned fixed value to. Further, the preset unit 86, when the sector mark has been detected, supplies the timing correcting data to the sector-length counter 78 so as to set the appropriate count number to the counter 78. The thus supplied timing correcting data includes instructions to correct the count number according to an offset amount corresponding to once counting action relevant to the above-mentioned time Tz. As a result, the address-mark detecting timing pulses in synchronization with the synchronous data can be obtained at the output of the delay line 77 during the time between the time the sector mark is detected and the time of the first address-mark detection. The first address-mark detection results in the corresponding timing correcting pulse to correct the count number in the counter 78. Thus, it is possible to properly correct generating timing of the address-mark detecting timing pulses and other reading-out timing pulses over all the recording zones in the disc being accessed, the recording zones having different reproducing frequencies relevant thereto. This is because, as described above, the preset unit 86 corrects the current count number of the counter 78 regarding the component Tz depending on the frequency of the zone clock pulses, the frequency being approximately the same as the variable relevant reproducing frequency. Thus, it is possible to correct the count number in the counter 78 according to the time delay of the synchronous data with respect to the asynchronous data.

The selector 54, if it receives the sector-mark detection pulse, selects the output of the delay line 77 and selects the output of the sector-length counter 78 if it receives the address-mark detection pulses. As a result, during time between time the sector mark has been detected and time of the first address-mark detection, the delay line 77 is inserted between the sector-length counter 78 and the address-mark detecting gate producing unit 55. Thus, the time delay component tc is added so that, during the time, the address-mark detecting timing pulses according to the time delay tc+Tz and thus in synchronization with the synchronous data can be supplied to the producing unit 55.

The preset unit 86, when any of the timing correcting pulses has been supplied from the address-demodulating unit 73, supplies, together with the loading signal, the timing correcting data corresponding to the thus supplied timing correcting pulse to the sector-length counter 78. Thus, the current count number of the sector-length counter 78 is corrected to be in synchronization with the actual received timing of the synchronous data. Any of the timing correcting pulses is supplied from the address-demodulating unit 73 after the corresponding address mark has been detected, as will be described later. Thus, after the sector-length counter 78 has thus been in synchronization with the synchronous data, that is after the corresponding address mark has been detected the selector 54 thus selects the output of the sector-length counter 78. As a result, the address-mark detecting reference pulses output by the sector-length counter 78 are, without being delayed by the time delay tc added by the delay line 77, supplied to the address-mark detecting gate producing unit 55. The address-mark detecting reference pulses thus serve as the address-mark detecting timing pulses.

The gate-span setting unit 87 generates the above-mentioned gate-span setting signal to be supplied to the address-mark detecting gate producing unit 55. The gate-span setting signal instructs as to whether the necessary and minimum first time span or the second time span longer than the first time span is used as time span of the address-mark detecting gate period which is to be defined by address-mark detecting gate producing unit 55.

The gate-span setting unit 87 produces the gate-span setting signal instructing the first time span when one of the sector-mark detection pulse, timing correcting pulses (1) and (2) has been received. If the above-mentioned counted value in the sector-length counter 78 has reached the above-described reference value, the setting unit 87 produces the gate-span setting signal instructing the second time span. This reference value is the counted value of the sector-length counter 78 corresponding to the rear end of all the address-mark detecting gate periods defined for the sector. Thus, the longer second time span is used as a time span of the address-mark detecting gate period when reading out of the subsequent sector is begun.

The address-mark detecting gate producing unit 55 receives the address-mark detecting timing pulses, indicating the beginning of the address marks present in the synchronous data, from the sector-length counter 78 and thus produces a signal indicating the corresponding address-mark detecting gate periods to be sent to the address-mark detecting unit 56. The time spans of the address-mark detecting gate periods are determined using the zone clock pulses and are either the first time span or second time span according to the above-mentioned instructions supplied by the gate-span setting unit 87. The address-mark detecting unit 56 detects the address marks from the synchronous data in synchronization with the synchronization clock pulses during the address-mark detecting gate periods. The detecting unit 56 outputs address-mark detection pulses when the ends of the address marks have been detected.

The address-data demodulating gate producing unit 57 produces the address-data demodulating gate periods using, as reference time, the time when the address-mark detection pulses have been received. Signals indicating the address-data demodulating gate periods are sent to the address-data demodulating unit 58. The time spans of the address-data demodulating unit are determined using the zone clock pulses and the address-data demodulating unit 58 demodulates data from the synchronous data during the address-data demodulating gate periods.

The address-data determining unit 59 determines what numbers orders of the address data sent from the address-data demodulating unit 58 in the sector are. In accordance with the determined numbers, the unit 59 produces any one of timing correcting pulses (1), (2) and (3) to be sent to the preset unit 86. That is, if a determined number of the above-mentioned determining numbers indicates that relevant address data is address data written in the first address part ID1 shown in FIG. 2, the unit 59 produces the timing correcting pulse (1) indicating the beginning of the VFO2. Similarly, if a determined number of the above-mentioned determining numbers indicates that relevant address data is address data written in the second address part ID2, the unit 59 produces the timing correcting pulse (2) indicating the beginning of the VFO3. If a determined number of the above-mentioned determining numbers indicates that relevant address data is address data written in the third address part ID3, the unit 59 produces the timing correcting pulse (3) indicating the beginning of the flag part.

Thus, the preset unit 86, when it has received the timing correcting pulses (1), (2) and (3) sent from the determining unit 59, supplies the timing correcting data corresponding to the thus received timing correcting pulses to the sector-length counter 78. As a result, the current count numbers of the sector-length counter 78 are corrected so as to properly consider timing of the timing correcting pulses. Thus, the sector-length counter 78 is corrected to be in synchronization with the synchronous data. As a result, the counter 78 outputs the address-mark detecting timing pulses and other reading-out timing pulses to be in synchronization with coming timing of the various parts included in the sector as shown in FIG. 2.

Operation in the case when the address mark AM1 shown in FIG. 2 is detected will now be described. As described above, the sector-length counter 78 receives the timing correcting data, for correcting the count number in the counter 78 according to the above-described time delay Tz between the synchronous data and asynchronous data, when the sector-mark detection pulse has been received. The counter 78 thus counts the zone clock pulses for an offset corresponding to the time delay Tz (time of once counting) and then counts for the data length of the VFO1 since the rear end of the sector mark SM was detected. As a result, the counter 78 generates the address-mark detecting reference pulse a (shown in FIG. 9D) for the address mark AM1 when the above counting has been completed. The address-mark detecting reference pulse a is then further delayed through the delay line 77 for the above-mentioned time delay tc. As a result, the address-mark detecting timing pulse d (shown in FIG. 9E) is obtained and is thus in synchronization with the actual beginning of the address mark AM1, in the synchronous data, shown in FIG. 9B. Thus, the obtained pulse properly instructs the beginning of the address mark AM1 in the synchronous data and is supplied to the address-mark detecting gate producing unit 55 via the selector 54.

Figure 9:
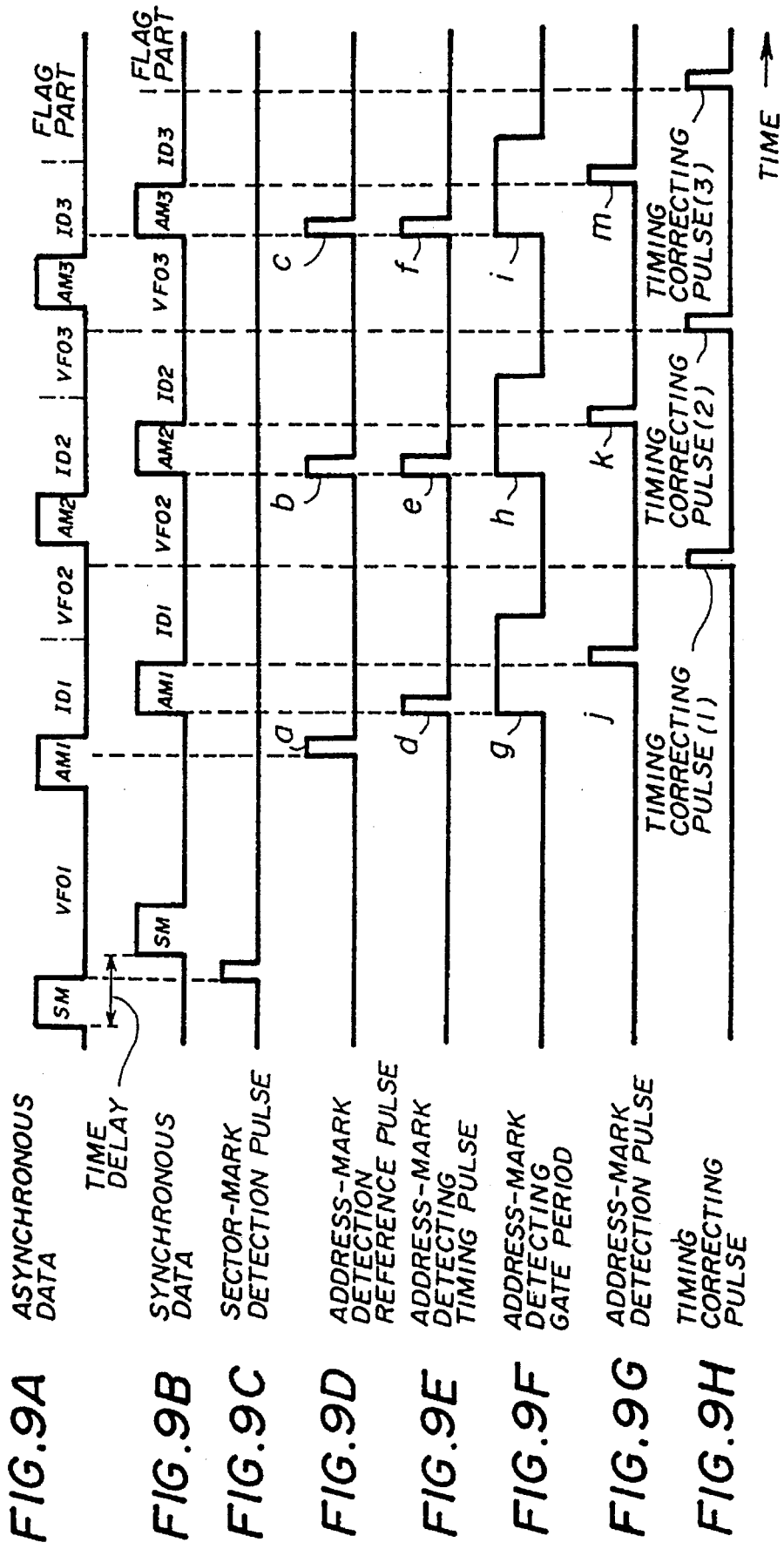
FIGS. 9A, 9B, 9C, 9D, 9E, 9F, 9G and 9H show timing charts of signals used in the units shown in FIG. 8.

The address-mark detecting gate producing unit 55 receives the address-mark detecting timing 10 pulse for AM1 and thus produces the address-mark detecting gate period g for AM1 shown in FIG. 9F to be sent to the address-mark detecting unit 56. The gate producing unit 55 uses the gate-span setting signal, specifying the above-mentioned first time span, sent from the gate-span setting unit 87 so that the produced address-mark detecting gate period has the first time span.

The address-mark detecting gate period for AM1 is accurately in synchronization with the actual coming timing of the address mark AM1 as a result of properly creating time delay from the time the sector mark SM shown in FIG. 9A has been detected and the time when the gate period g shown in FIG. 9F is started. The time-delay creation has been described above and the accurate synchronization is kept over all the recording zones since the counting in the sector-length counter 78 is made using the zone clock pulses having the frequency corresponding to the relevant recording zone and also the above-mentioned time delay Tz depending on the recording zone is added to the fixed time delay tc. Further, since the time spans of the gate periods are determined using the zone clock pulses, the thus obtained gate periods correspond to fixed data lengths in the parts of the sector while the recording zone differs among the recording zones.

The address-mark detecting unit 56, during the time span of the thus produced address-mark detecting gate period g, shown in FIG. 9F, for AM1, detects the address mark AM1 shown in FIG. 9B from the synchronous data in synchronization with the synchronization clock pulses. The unit 56 thus outputs the address-mark detection pulse j, shown in FIG. 9G, for AM1 indicating the rear end of the address mark AM1.

The address-data demodulating gate producing unit 57 produces the address-data demodulating gate period for the address data including data written in the address part ID1 using, as a reference time, the time the address-mark detection pulse j for AM1 has been received. A signal indicating the produced gate period is sent to the address-data demodulating unit 58 which, during the time span of the sent gate period, demodulates the address data written in the address part ID1.

The address-data determining unit 59, using the address data of the address part ID1 sent from the demodulating unit 58, determines that the thus sent address data is data in the first address part in the sector. As a result, the determining unit 59 produces the above-mentioned timing correcting pulse (1) shown in FIG. 9H instructing the beginning of the VFO2 in the synchronous data and sends the pulse to the preset unit 86.

The sector-length counter 78 has been counting the zone clock pulses in timing earlier, by the above-mentioned time tc, with respect to the actual received timing of the parts including the sector shown in FIG. 2 by time the above-mentioned timing correcting pulse (1) is supplied to the counter 78 since the sector mark has been detected. In fact, since the delay line 77 is kept inserted during the time between the time of sector-mark detection and the time of the address-mark AM1 detection, the address-mark detecting timing pulse for AM1 including the time delay tc is in synchronization with the actual coming timing of the AM1. The preset unit 86, if it has received the timing correcting pulse (1), sets, to the counter 78, a count number corresponding to data length between the beginning of the sector and the beginning of the VFO2. Thus, operation of the counter 78, after receiving the timing correcting pulse (1), is in synchronization with the actual coming timing of the synchronous data. Thus, in synchronization with the actual coming timing of the synchronous data, the counter 78, in sequence, outputs the address-mark detecting reference pulses and other reading-out timing pulses at time the count number reaches the predetermined count numbers corresponding to the beginning of the address marks AM2, AM3, and the beginning of the other parts in the sector shown in FIG. 2.

Operation in cases where the address marks AM2 and AM3 are detected will now be described. After the timing correcting pulse (1) has been thus produced, the sector-length counter 78 produces the address-mark detecting reference pulse for AM2 and address-mark detecting reference pulse for AM3, b and c shown in FIG. 9D, to be sent to the address demodulating unit 73. The production of the address-mark detecting reference pulse for AM2 and address-mark detecting reference pulse for AM3 uses timing obtained as a result of counting the zone clock pulses for numbers corresponding to the data lengths of VFO2, AM2, ID2 and VFO3. As described above, the counter 78 counts so as to obtain timing for each part of the sector, shown in FIG. 2, in synchronization with the actual received time of the corresponding parts of the sector in the synchronous data. That is, the counter operates in synchronization with the synchronous data. The selector 54, after receiving the address-mark detection pulse for AM1, selects an input signal received without passed through the delay line 77. Thus, the address-mark detecting reference pulses for AM2 and AM3 are, as a result of being passed through the selector 54, supplied to the address-mark detecting gate producing unit 55 as they are serving as the address-mark detecting timing pulses for AM2 and AM3, e and f shown in FIG. 9E.

The address-mark detecting gate producing unit 55 produces the address-mark detecting gate periods for AM2 and AM3, h and i shown in FIG. 9F, having timing in synchronization with the actual received timing of the beginning of the address marks AM2 and AM3. Thus, using the thus produced gate periods for AM2 and AM3, the address mark detecting unit 56 effectively detects the address marks AM2 and AM3, and produces the corresponding address-mark detection pulse for AM2 and that for AM3, k and m shown in FIG. 9G.

The address-data determining unit 59, if it has received the address data of the second address part ID2 subsequent to the address mark AM2, produces the timing correcting pulse (2), shown in FIG. 9H, instructing the beginning timing of the VFO3. The address-data determining unit 59, if it has received the address data of the third address part ID3 subsequent to the address mark AM3, produces the timing correcting pulse (3), shown in FIG. 9H, instructing the beginning of the flag part.

The sector-length counter 78 operates in synchronization with the synchronous data due to the preset function of the above-mentioned timing correcting pulse (1). In addition to this synchronization function, the timing correcting pulses (2) and (3) also, in sequence, preset the count numbers corresponding to the beginning timing of the VFO2 and VFO3 to the sector-length counter 78 through the preset unit 86. Thus, the count number in the counter 78 is accurately corrected.

The sector-length counter ? 8, after producing the address-mark detecting timing pulse for AM3, produces the various reading-out timing pulses such as a flag-part beginning timing pulse, a data-part beginning timing pulse, a Buffer-part beginning timing pulse, and so forth to be sent to the data demodulating unit 45. The demodulating unit 45, using the thus sent timing pulses as reference timing, demodulates data from the synchronous data.

Thus, in the second embodiment of the present invention, the timing of the address-mark detecting timing pulse is corrected according to the time delay of the synchronous data with respect to the asynchronous data as follows: The component of the time delay depending on the period of the zone clock pulses is generated as a result of being counted by the sector-length counter 78; and the other component independent of the period of the zone clock pulses is generated by creating a corresponding time delay through the delay line 77. Thus, through different recording zones being accessed, the timing of the address-mark detecting data periods are appropriate to the actual coming timing of the address marks and it is possible to reduce the time spans of the gate periods as short as possible. As a result, it is possible to reduce possibility of missing/erroneous address-mark detection, reliability of the disc apparatus being thus improved.

If the address marks have been properly detected for the antecedent sector and proper sector-mark detection is missed for the current sector, the sector-length counter 78, after having counted a number corresponding to the data lengths of all the parts for the antecedent sector, begins to count for the current sector from the initial value '0' corresponding to the beginning of the current sector. In fact, the counter 78 is the loop-type counter. Thus, it is possible to produce the address-mark detecting timing pulses having timing approximately appropriate to the actual coming timing of the address-marks of the current sector in the synchronous data. In this case, since the gate-span setting unit 87 has not received the sector-mark detection pulse, produces the gate-span setting signal instructing the longer second time span, the address-mark detecting gate periods thus having the longer time spans. The longer-time-span gate periods are likely to prevent missing of address-mark detection for the current sector.

If the sector mark could not be detected and at least one of the address marks could be detected, the timing correcting pulse corresponding to the detected address mark corrects the count number of the sector-length counter 78 similarly to the case where the sector mark has been detected. In the case where the sector mark could not be detected and the address marks AM1 or AM2 of the address marks could be detected, the corresponding timing correcting pulse (1) or (2) is thus produced and makes the gate-span setting unit 87 to specify the shorter first time span. Thus, the shorter time-span gate periods are likely to prevent erroneous address-mark detection.

Further, if the sector mark has been properly detected, the operation of the sector-length counter 78 is corrected not only at the sector-mark detection time but also address-mark detection resulting in the production of the corresponding timing correcting pulses (1), (2) and (3). Thus, it is possible to demodulate data from the sector accurately without fail.

Figure 10:
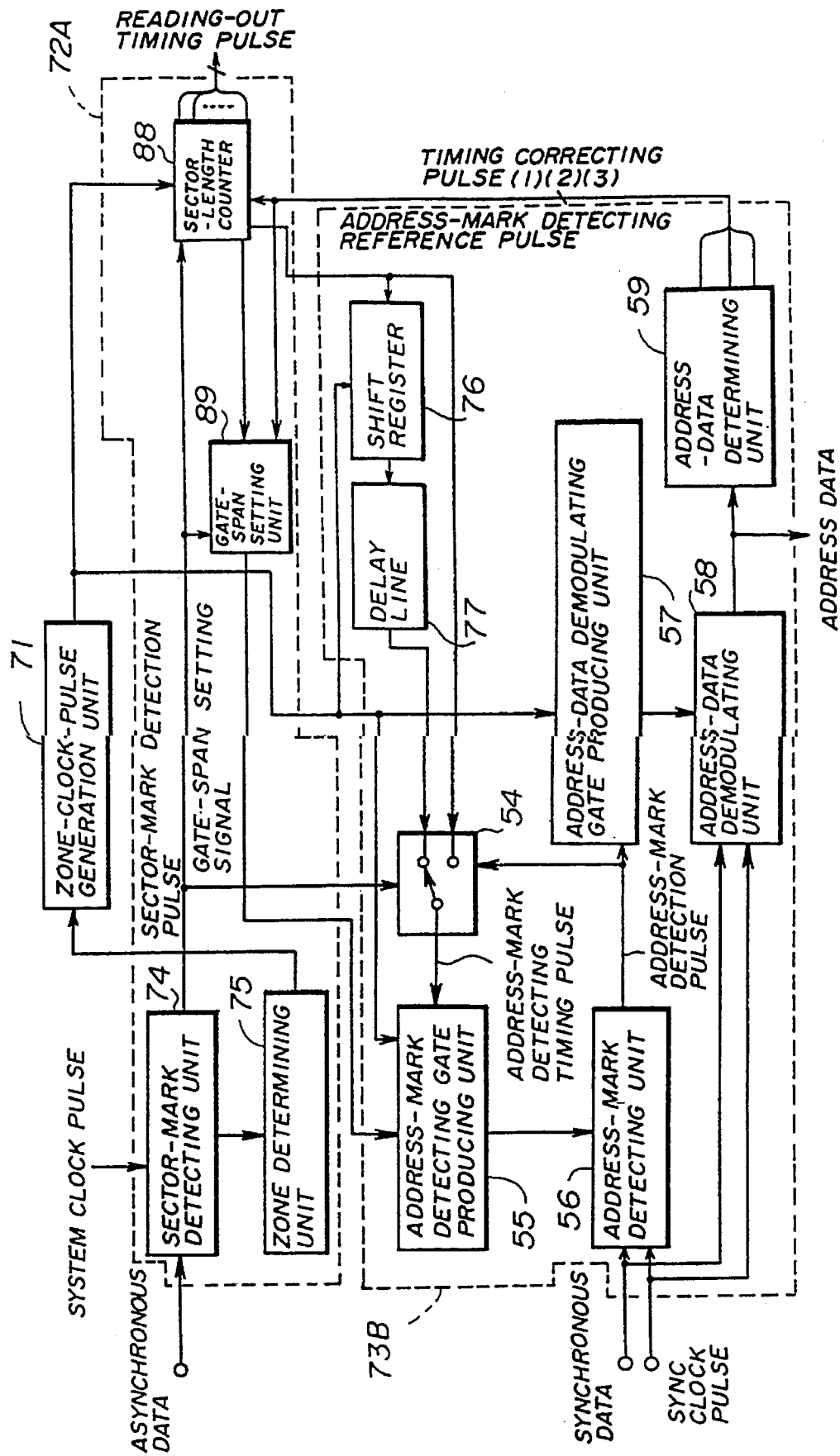
FIG. 10 shows a block diagram of a reading-out timing signal producing unit and an address demodulating unit shown in FIG. 7 in the third embodiment.

With reference to FIG. 10, the reading-timing signal producing unit 72A and address-demodulating unit 73A in a third embodiment of the present invention will now be described. Reference numerals are given to blocks shown in FIG. 10 identical to blocks shown in FIG. 8, the reference numerals being the same as those given to the corresponding blocks of the units shown in FIG. 10. Description of the identical blocks are appropriately omitted.

Figure 11:
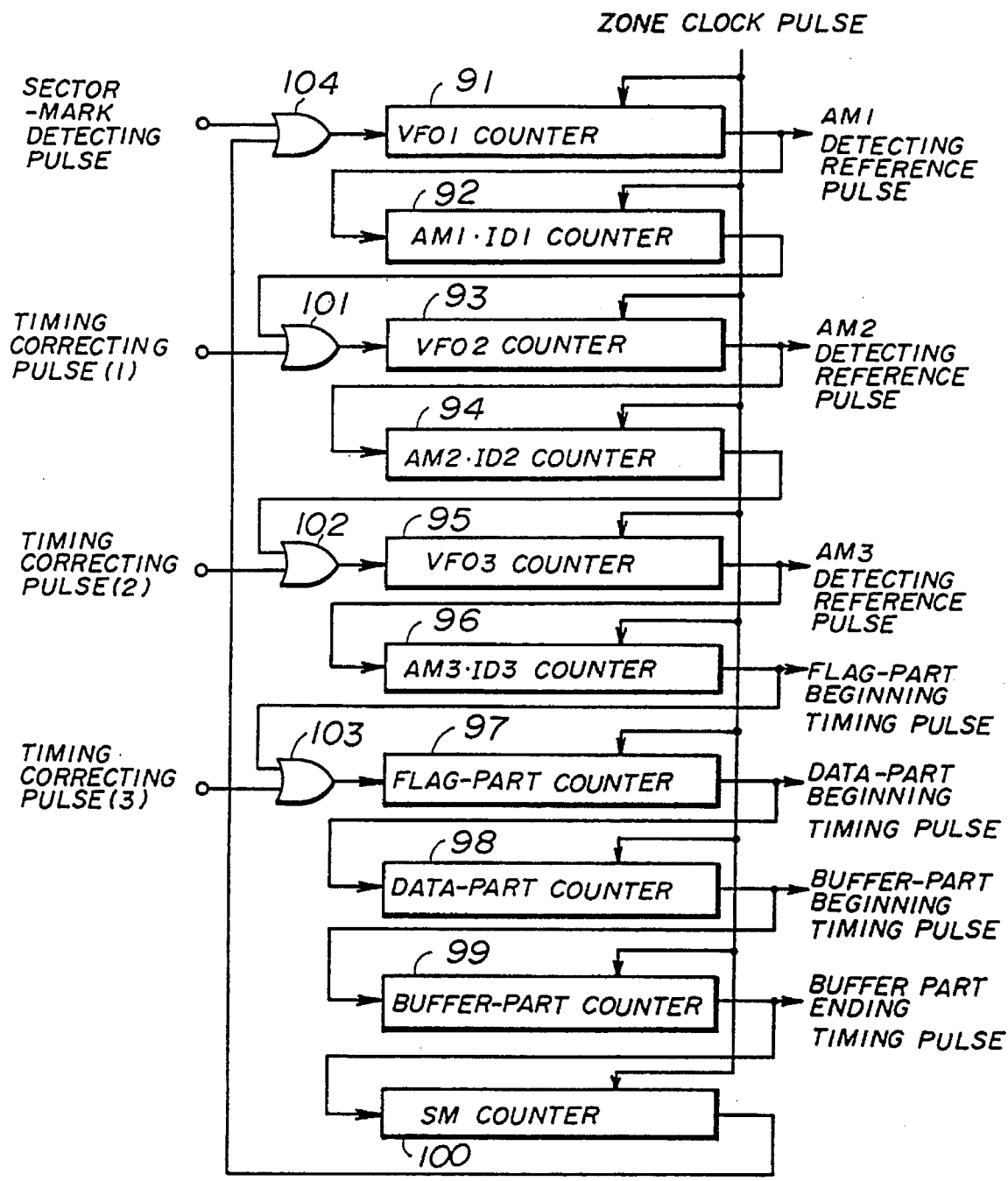
FIG. 11 shows a block diagram of a sector-length counter shown in FIG. 10.

With reference to FIG. 11, a concept of the sector-length counter 88 included in the reading-timing signal producing unit 72A shown in FIG. 10 will now be described. It is possible to consider that the counter 88 is a set of 10 counters 91 through 100 for counting the zone clock pulses for data lengths of various parts included in the sector. The counter 88 is the above-mentioned loop-type counter, after having counted the number corresponding to the data lengths of all the parts for the antecedent sector, begins to count for the current sector from the initial value '0' corresponding to the beginning of the current sector even if the sector mark has not been detected for the current sector. Specifically, an SM counter 100 supplies a count completion signal to a VFO1 counter 91 via an OR unit 104.

Each counter of the 10 counters produces the count completion signal at time the counter has finished a relevant counting operation, the count completion signal acting as a reset signal for resetting a subsequently-connected counter.

The sector-length counter 88 counts the zone clock pulses for numbers corresponding to the various parts included in the sector after receiving the sector-mark detection pulse so as to obtain the address-mark detecting reference pulses and other various reading timing pulses. The address-mark detection corrects the operation of the counter 88 with the timing correcting pulses supplied from the address demodulating unit 73A. Thus, the counter's operation is in synchronization with the synchronous data.

In the third embodiment shown in FIG. 10, the time delay of the synchronous data with respect to the asynchronous data is generated as follows: A shift 30. register 76 counting the zone clock pulses and the delay line 77 included in the address demodulating unit 73A generate the time delay. As described above, the time delay of the synchronous data with respect to the asynchronous data consists of the fixed time delay tc generated by the delay line 77 and the zone-clock-pulse one-period Tz generated by the shift register 76.

The gate-span setting unit 89, similarly to the gate-span setting unit 87 shown in FIG. 8, produces the gate-span setting signal specifying the shorter time span if one of the sector-mark detection signal, the timing correcting pulse (1) and (2) has been received. However, the sector-length counter 88 supplies a pulse indicating predetermined timing after the production of the address-mark detecting gate periods instead supplying a count number. Then, the gate-span setting unit 89 produces the gate-span setting signal instructing the longer second time span.

Operation in the case when the address mark AM1 is detected will now be described. The VFO1 counter 91 of the sector-length counter 88, after receiving the sector-mark detection pulse, counts to the number corresponding to the VFO1 data length so as to output the address-mark detecting reference pulse for AM1. The address-mark detecting reference pulse is delayed by the shift register 75 and delay line 77 for an amount of time corresponding to the time delay of the synchronous data with respect to the asynchronous data. Thus, the address-mark detecting timing pulse for AM1 is produced, the pulse thus indicating the beginning timing of the address mark AM1 in the synchronous data. The timing of the thus produced address-mark detecting timing pulse is in synchronization with the actual coming timing of the beginning of the address mark AM1 in cases of even the different recording zones being accessed.

The selector 54, after receiving the sector-mark detection pulse, selects the signal having been passed through the delay line 77. The signal, serving as the address-mark detection timing pulse for AM1, is thus supplied to the address-mark detecting gate producing unit 55. The producing unit 55 thus produces address-mark detecting gate period for AM1 to be supplied to the address-mark detecting unit 56. The timing of the thus produced address-mark detecting gate period is in synchronization with the actual coming timing of the beginning of the address mark AM1 in cases of even the different recording zones being accessed. Further, since the gate-time-spans are obtained using the zone clock pulses, the thus obtained gate-time-spans correspond to fixed data lengths among the different recording zones being accessed.

The address-mark detecting unit 56, during the time span of the thus produced address-mark detecting gate period for AM1, detects the address mark AM1 shown in FIG. 9B from the synchronous data in synchronization with the synchronization clock pulses. The unit 56 thus outputs the address-mark detection pulse for AM1 indicating the rear end of the address mark AM1. The address-data demodulating gate producing unit 57 produces the address-data demodulating gate period for the address data including data written in the address part ID1 using, as a reference time, the time the address-mark detection pulse for AM1 is received. A signal indicating the produced gate period is sent to the address-data demodulating unit 58 which, during the time span of the sent gate period, demodulates the address data written in the address part ID1.

The address-data determining unit 59, using the address data of the address part ID1 sent from the demodulating unit 58, determines that the thus sent address data is data in the first address part in the sector. As a result, the determining unit 59 produces the above-mentioned timing correcting pulse (1) indicating the beginning of the VFO2 (shown in FIG. 2) in the synchronous data and sends the pulse to the sector-length counter 88. The sector-length counter 88 has been counting the zone clock pulses so that timing of count numbers obtained in the counter 88 is in synchronization with the actual received timing of the relevant parts of the sector in the asynchronous data. The above synchronization is maintained during the time between the time the sector mark has been detected and the time the above-mentioned timing correcting pulse (1) is supplied to the counter 88. In fact, during the time, the shift register 76 and delay line 77 are prevented, due to the function of the selector 54, from being inserted before the address-mark detecting gate producing unit 55.

In the sector-length counter 88, after receiving the timing correcting pulse (1), the pulse (1) is supplied to the VFO2 counter 93 shown in FIG. 11 via an OR unit 101 so that the VFO2 counter 93 is reset. Thus, the counter 88 uses the timing of the timing correcting pulse (1) as the timing at which the counter 88 operates for the VFO2 beginning in the synchronous data. Thus, the counter 88 operates in synchronization with the synchronous data.

In address-mark AM2 and AM3 detection, the VFO2 counter 93, an AM2.ID2 counter 94 and a VFO3 counter 95, in sequence, of the sector-length counter 88 count the zone clock pulses so as to supply the address-mark detecting reference pulses for AM2 and AM3 to be supplied to the address demodulating unit 73A.

The sector-length counter 88, after receiving the timing correcting pulse (1), operates in synchronization with the synchronous data as described above. The address-mark AM2 and AM3 detecting reference pulses have thus timing in synchronization with the timing in the synchronous data. The selector 54 selects the input signal that was not passed through the shift register 76 and delay line 77 after receiving the address-mark AM1 detection pulse. Thus, the reference pulses are supplied unchanged to the address-mark detecting gate producing unit 55, the reference pulses thus serving as the address-mark AM2 and AM3 detecting timing pulses. The address-mark detecting gate producing unit 55, according to the thus supplied address-mark AM2 and AM3 detecting pulses, produces the address-mark AM2 and AM3 detecting gate periods accurately in synchronization with the actual received timing of the beginning of the address marks AM2 and the beginning of the AM3. Thus, the address marks AM2 and AM3 are effectively detected by the address-mark detecting unit 56 which thus produces the address-mark AM2 and AM3 detection pulses.

The address-data determining unit 59, using the address data of the address part ID2 subsequent to the thus detected address mark AM2 and sent from the demodulating unit 58, determines that the thus sent address data is data in the second address part in the sector. As a result, the determining unit 59 produces the above-mentioned timing correcting pulse (2) instructing the beginning of the VFO3 in the synchronous data and sends the pulse to the sector-length counter 88. Similarly, the address-data determining unit 59, using the address data of the address part ID3 subsequent to the thus detected address mark AM3 and sent from the demodulating unit 58, determines that the thus sent address data is data in the second address part in the sector. As a result, the determining unit 59 produces the above-mentioned timing correcting pulse (3) instructing the beginning of the flag part in the synchronous data and sends the pulse to the sector-length counter 88. The sector-length counter 88 has been being counting the zone clock pulses so that timing of count numbers obtained in the counter 88 is in synchronization with the actual coming timing of the relevant parts of the sector in the synchronous data after the time at which the above-mentioned timing correcting pulse (1) is supplied to the counter 88. In addition to this synchronization, the timing correcting pulses (2) and (3) also correct the count numbers of the counter 88 so that further accurate count numbers can be obtained.

The sector-length counter 88, after producing the address-mark detecting timing pulse for AM3, produces the various reading-out timing pulses such as a flag-part beginning timing pulse, a data-part beginning timing pulse, a buffer-part beginning timing pulse, and so forth to be sent to the data demodulating unit 45. The demodulating unit 45, using the thus sent timing pulses as reference timing, demodulates data from the synchronous data.

The shift register 76 is used to count one pulse of the zone clock pulses in the third embodiment shown in FIG. 10. However, it is also possible that other clock pulses are provided having a frequency several times the frequency of the zone clock pulses, the shift register 76 thus counting the thus provided other clock pulses the several times so as to obtain the time span corresponding to one period of the zone clock pulses. Thus, it is possible to improve accuracy in the time delay Tz of the one period of the zone clock pulses.

The disc apparatus using the structure shown in FIG. 10 in the third embodiment operates similarly to the operation in the disc apparatus in the second embodiment except for the operations described above and thus offers similar advantages.

Figure 12:
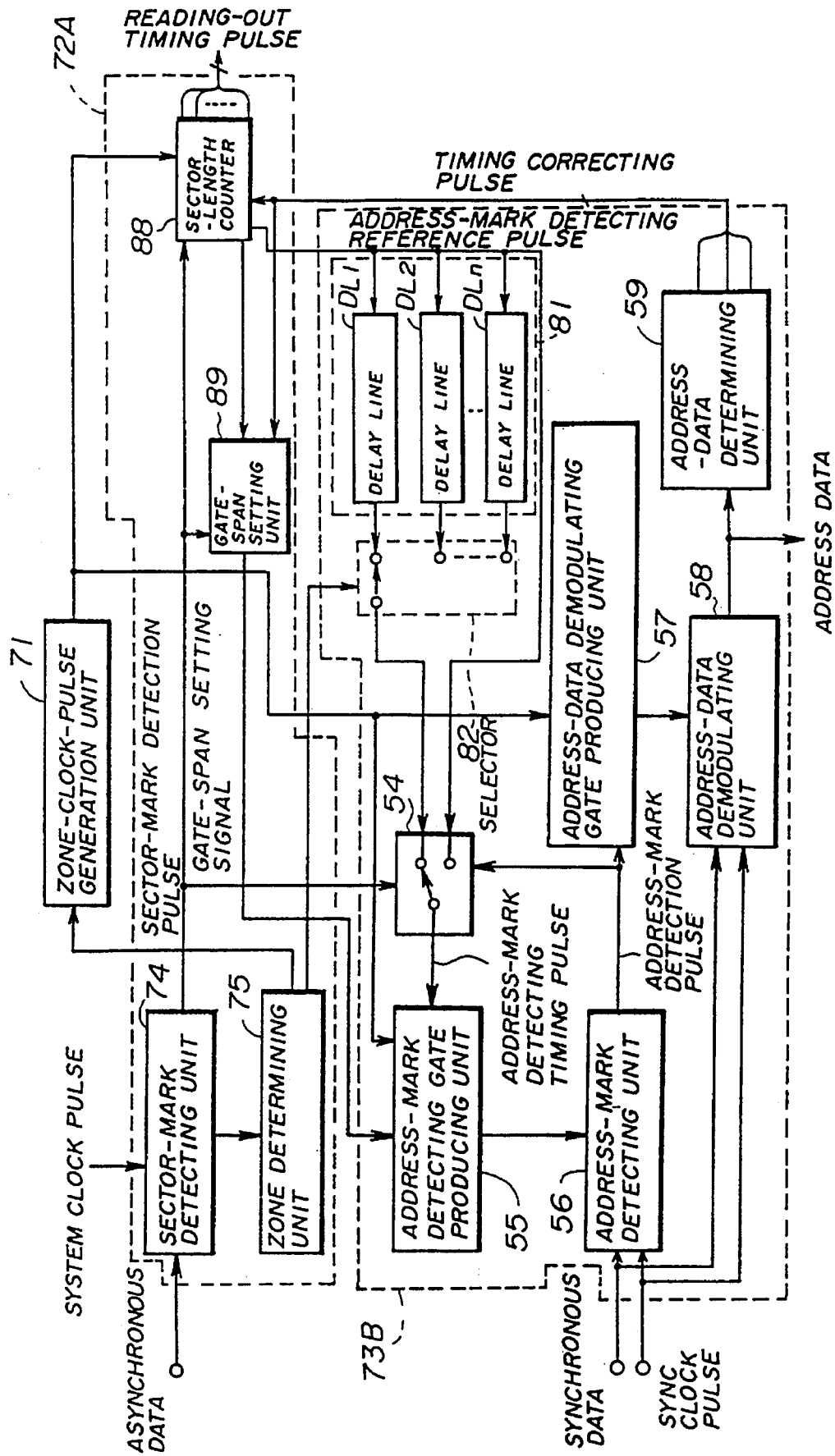
FIG. 12 shows a block diagram of a reading-out timing signal producing unit and an address demodulating unit shown in FIG. 7 in the first variant of the third embodiment.
Figure 13:
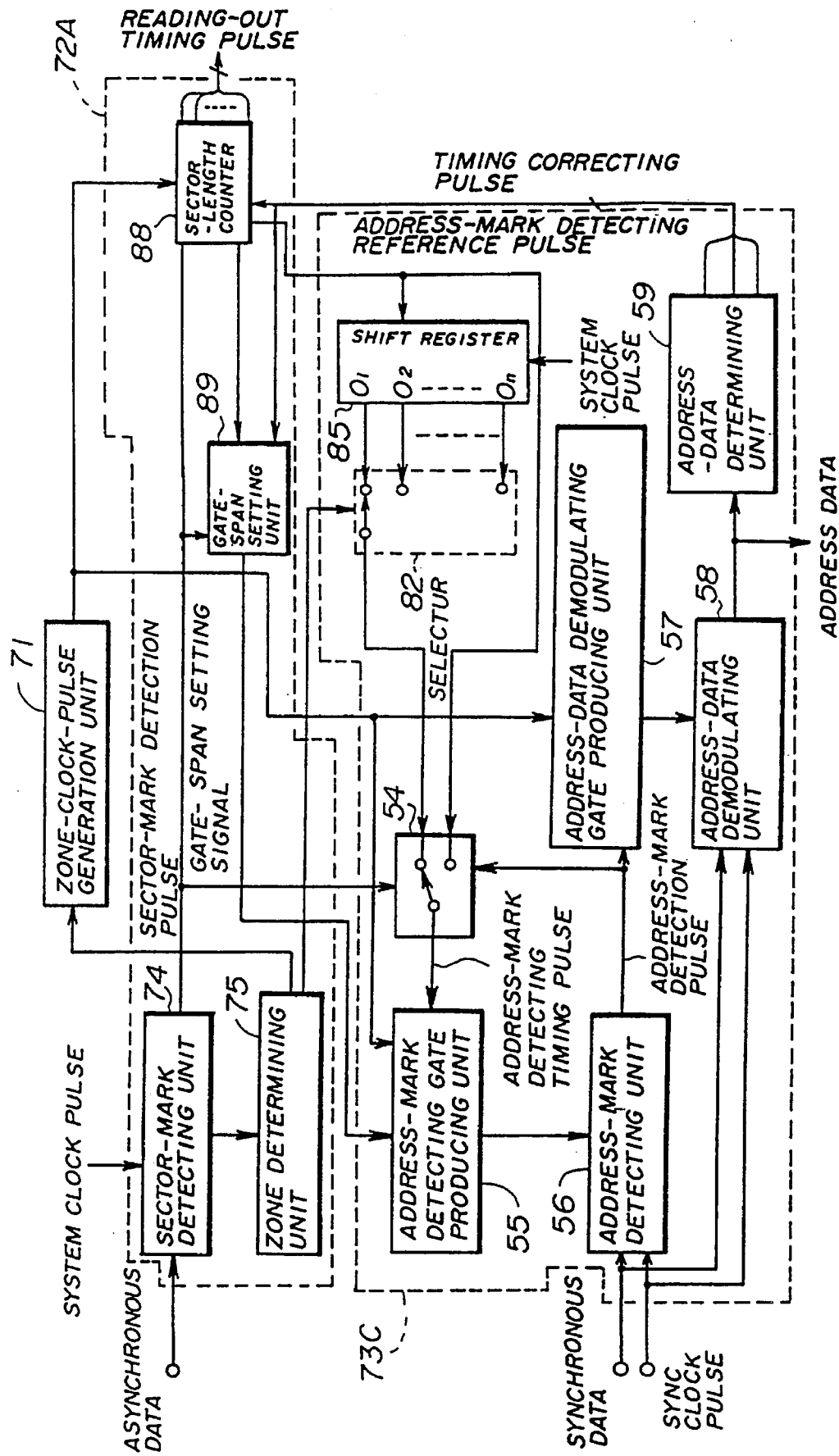
FIG. 13 shows a block diagram of a reading-out timing signal producing unit and an address demodulating unit shown in FIG. 7 in the second variant of the third embodiment.

With reference to FIGS. 12 and 13, the reading-timing signal producing unit 72A and address-demodulating units 73B and 73C in first and second variants of the third embodiment of the present invention will now be described. Reference numerals are given to blocks shown in FIGS. 12 and 13 identical to blocks shown in FIG. 10, the reference numerals being the same as those given to the corresponding blocks of the units shown in FIGS. 12 and 13. Description of the identical blocks are appropriately omitted.

In the first variant shown in FIG. 12, a delay unit 81 and selector 82 are used to provide a delay time the same as the time delay of the synchronous data with respect to the asynchronous data. The delay unit 81 includes n delay lines $DL_1$ through $DL_n$ having delay times the same as the delay times of the synchronous data with respect to the asynchronous data in the possible n recording zones 1 through n. The selector 82, according to zone determination made by the zone determining unit 75, selects output via a delay line among the delay lines $DL_1$ through $DL_n$ relevant to the recording zone including the currently accessing sector. Thus, the delay unit 81 and selector 82 appropriately provide a delay time the same as the time delay of the synchronous data with respect to the asynchronous data for the different recording zones being accessed needing the different frequencies of the zone clock pulses.

Therefore, it is possible to supply the address-mark AM1 detecting timing pulse, to the address-mark detecting gate producing unit 55, obtained as a result of delaying the address-mark AM1 detecting reference pulse for an amount corresponding to the time delay of the synchronous data with respect to the asynchronous data, for the recording zones being accessed. Thus, similarly to the third embodiment shown in FIG. 10, for the recording zones, it is possible to supply accurate timing of the address-mark detecting gate periods and to effectively reduce the time spans of the gate periods. As a result, erroneous address-mark detection can be prevented. Further, various advantages similar to those obtained in the third embodiment can be obtained in the first variant shown in FIG. 12. It is also possible, instead of providing the delay lines $DL_1$ through $DL_n$ for all the recording zones one by one, to provide delay lines, each for a plurality of recording zones. In this method, common delay time is supplied for a plurality of recording zones. Thus, it is possible to reduce the number of delay lines to be provided in the delay unit 81.

In the second variant shown in FIG. 13, a shift register 85 and the selector 82 are used to supply delay time the same as the time delay of the synchronous data with respect to the asynchronous data. The shift register 85 counts system clock pulses having a constant frequency considerably higher than all the possible frequencies of the zone clock pulses so as to delay an input signal for a time the same as the time delay of the synchronous data with respect to the asynchronous data for the possible n recording zones 1 through n and thus supplies relevant output signals via n output terminals $O_1$ through $O_n$. The selector 82, according to zone determination made by the zone determining unit 75, selects the output of a delay line among the output of the delay lines $DL_1$ through $DL_n$ relevant to the recording zone including the currently accessed sector. Thus, the shift register 85 and selector 82 appropriately supply delay time the same as the time delay of the synchronous data with respect to the asynchronous data for the different recording zones being accessed needing the different frequencies of the zone clock pulses.

Therefore, similar to the first variant shown in FIG. 12, it is possible to supply the address-mark AM1 detecting timing pulse, to the address-mark detecting gate producing unit 55, obtained as a result of delaying the address-mark AM1 detecting reference pulse for an amount corresponding to the time delay of the synchronous data with respect to the asynchronous data, for the recording zones being accessed. Thus, similarly to the third embodiment shown in FIG. 10, for the recording zones, it is possible to supply accurate timing of the address-mark detecting gate periods and to effectively reduce the time spans of the gate periods. As a result, erroneous address-mark detection can be prevented. Further, various advantages similar to those obtained in the third embodiment can be obtained in the second variant shown in FIG. 13.

Further, the present invention is not limited to the above described embodiments, and variations and modifications may be made without departing from the scope of the present invention.

What is claimed is:

1. A disc apparatus, for reading data previously written in a disc serving as a recording medium, said data being written in said disc in each of a plurality of sectors provided in said disk along a circumferential direction of said disc, said plurality of sectors being provided in a plurality of zones classified along a radius of said disc, different recording frequencies being used for the data writing for said plurality of zones, said disc being rotated at a constant angular velocity during the data writing, each sector having data written therein, each sector further having a sector-beginning mark written therein which indicates the beginning of said sector and which can be detected from an asynchronous signal reproduced from the disk; and each sector further having at least one data-beginning mark written therein which indicates the beginning of said data, said data-beginning mark being located at a position separated by an interval from said sector-beginning mark and being detectable only from a synchronous data signal using a synchronization clock signal;

wherein said disc apparatus comprises:
first detecting means for detecting said sector-beginning mark from said synchronous reproduced signal;
zone determining means a connected to said first detecting means, for determining which zone is currently being accessed in said disc;
clock extracting means for extracting said synchronization clock signal and said synchronous data signal from said asynchronous reproduced signal;
second detecting means, connected to said clock extracting means and starting its operation based on a detection result of said first detecting means, for detecting said data-beginning mark; and
delaying means, connected between said first detecting means and said second detecting means, for altering the timing at which said second detecting means starts its operation, based on a determination result of said zone determining means, so that a data-beginning mark occurring after said interval may be detected.

2. The disc apparatus according to claim 1, further comprising gate producing means for producing a data-beginning mark detecting gate period at the end of a time delay determined by said delaying means following the time said sector-beginning mark has been detected,
said second detecting means attempting to detect said data-beginning mark during said gate period.

3. The disc apparatus according to claim 2, wherein:
a time span of the gate period of said gate producing means is determined to be a predetermined first time-span when each sector of said plurality of sectors is first accessed by said apparatus; and
said time span of said gate period is appropriately shortened when any one of said sector-beginning marks and said data-beginning marks is detected by said first detecting means or said second detecting means, respectively.

4. The disc apparatus according to claim 2, further comprising:
zone clock pulse producing means for producing zone clock pulses having a frequency suitable to the recording frequency relevant to said zone determined by said zone determining means;
said delaying means counting said zone clock pulses a predetermined number of times so as to determine a time period by which said starting of the operation of said second detecting means is delayed.

5. The disc apparatus according to claim 4, wherein said delaying means adds a predetermined additional delay time increment to said delay time so as to obtain a final delay time period by which said starting of the operation of said second detecting means is delayed.

6. The disc apparatus according to claim 5, wherein:
said data-beginning mark comprises a plurality of data-beginning marks; and
said delaying means omits the addition of said predetermined additional delay time increment to said delay time period in obtaining said final delay time after the first data-beginning mark of said plurality of data-beginning marks has been detected.

7. The disc apparatus according to claim 1, wherein said zone determining means determines which zone is currently being accessed in said disc using a predetermined characteristic of said sector-beginning mark which comprises a time span, corresponding to a length of said sector-beginning mark, in a condition where said disc is rotated in said constant angular velocity.

8. The disc apparatus according to claim 1, wherein said disc comprises an optical disc.

9. The disc apparatus according to claim 1, wherein said disc comprises a magnetic disc.

10. The disc apparatus according to claim 1, wherein said disc comprises a magneto-optical disc.

11. The disc apparatus according to claim 1, wherein the recording frequencies different for each of said plurality of zones are determined such that data recording densities are approximately uniform over said plurality of zones.

12. The disc apparatus according to claim 1, wherein said data-beginning mark indicates the beginning of address data included in said data, said address data indicating which position said sector including said data-beginning mark is located in said disc.

13. The disc apparatus according to claim 1, further comprising:

zone clock pulse producing means for producing zone clock pulses having a frequency suitable to the recording frequency relevant to said zone determined by said zone determining means;

said delaying means counting said zone clock pulses a predetermined number of times to as to determine a delay time period by which said starting of the operation of said second detecting means is delayed.

14. The disc apparatus according to claim 13, wherein said delaying means adds a predetermined additional delay time increment to said delay time period so as to obtain a final delay time by which said starting of the operation of said second detecting means is delayed.

15. The disc apparatus according to claim 14, wherein:

said data-beginning mark comprises a plurality of data-beginning marks; and said delaying means omits the addition of said predetermined additional delay time increment to said delay time period in obtaining said final delay time after the first data-beginning mark of said plurality of data-beginning marks has been detected.

* * * * *

UNITED STATES PATENT AND TRADEMARK OFFICE
CERTIFICATE OF CORRECTION

PATENT NO.   :   5,623,468
DATED        :   April 22, 1997
INVENTOR(S)  :   Takeda et al It is certified that error appears in the above-indentified patent and that said Letters Patent is hereby corrected as shown below:

CLAIM 1, Col. 23, Line 52, delete "synchronous" and substitute therefor ---asynchronous---; CLAIM 1, Col. 23, Line 53, after "means" insert a comma; CLAIM 1, Col. 23, LIne 53, delete "a"

Signed and Sealed this

Ninth Day of September, 1997

Attest:

BRUCE LEHMAN

Attesting Officer          Commissioner of Patents and Trademarks